US012676816B2

(12) United States Patent  
Li et al.

(10) Patent No.: US 12,676,816 B2  
(45) Date of Patent: Jul. 7, 2026

(54) PACKET PROCESSING METHOD, DEVICE, AND SYSTEM, AND COMPUTER-READABLE STORAGE MEDIUM

(71) Applicant: Huawei Technologies Co., Ltd., Shenzhen (CN)

(72) Inventors: Chenxi Li, Beijing (CN); Zhibo Hu, Beijing (CN); Ka Zhang, Beijing (CN); Cheng Li, Boulogne Billancourt (FR); Weidi Shi, Beijing (CN); Yang Xia, Beijing (CN); Zhenbin Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 18/942,012

(22) Filed: Nov. 8, 2024

(65) Prior Publication Data

US 2025/0071056 A1 Feb. 27, 2025

Related U.S. Application Data

(63) Continuation of application No. PCT/CN2022/143305, filed on Dec. 29, 2022.

(30) Foreign Application Priority Data

May 11, 2022 (CN) ........................ 202210510517.X  
Aug. 3, 2022 (CN) ........................... 202210929197.1

(51) Int. Cl.  
*H04L 45/74* (2022.01)  
*H04L 45/00* (2022.01)  
*H04L 45/02* (2022.01)

(52) U.S. Cl.  
CPC .............. *H04L 45/74* (2013.01); *H04L 45/02* (2013.01); *H04L 45/34* (2013.01)

(58) Field of Classification Search  
CPC .......... H04L 45/74; H04L 45/02; H04L 45/34  
See application file for complete search history.

(56) References Cited

U.S. PATENT DOCUMENTS

2022/0182323 A1* 6/2022 Hu ........................... H04L 45/50  
2024/0179091 A1* 5/2024 Narasimhan ............ H04L 45/74

FOREIGN PATENT DOCUMENTS

CN 112448888 A 3/2021  
EP 4009596 A1 6/2022  
(Continued)

OTHER PUBLICATIONS

W. Cheng et al: "Generalized SRv6 Network Programming for SRv6 Compression." Internet-Draft: draft-cl-spring-generalized-srv6-for-cmpr-04. Published: Oct. 25, 2021. total 18 pages.

*Primary Examiner* — Bryan Y Lee  
(74) *Attorney, Agent, or Firm* — Slater Matsil, LLP

(57) ABSTRACT

This application discloses a packet processing method including: receiving a first packet that includes a DA field and an SRH, where the DA field includes at least one C-SID that is sequentially arranged; determining, depending on whether another C-SID is further included after a first C-SID corresponding to the first node in the at least one C-SID, whether a first processing flavor corresponding to the first C-SID indicates a movement operation or a replacement operation; and if the first processing flavor indicates a movement operation, moving a target field that is after the first C-SID and that is in the DA field, to enable the target field to cover the first C-SID in the DA field; or if the first (Continued)

processing flavor indicates a replacement operation, replacing the first C-SID in the DA field with a second C-SID in the SRH.

20 Claims, 18 Drawing Sheets

(56)                          References Cited

FOREIGN PATENT DOCUMENTS

| | | | |
|---|---|---|---|
| EP | 4161006 | A1 | 4/2023 |
| WO | 2021036328 | A1 | 3/2021 |
| WO | 2021254500 | A1 | 12/2021 |

\* cited by examiner

Locator field
(locator)

| Address block (block) | Node identifier field (Node ID) | Function field (function) | Arguments field (arguments) | Padding field (padding) |

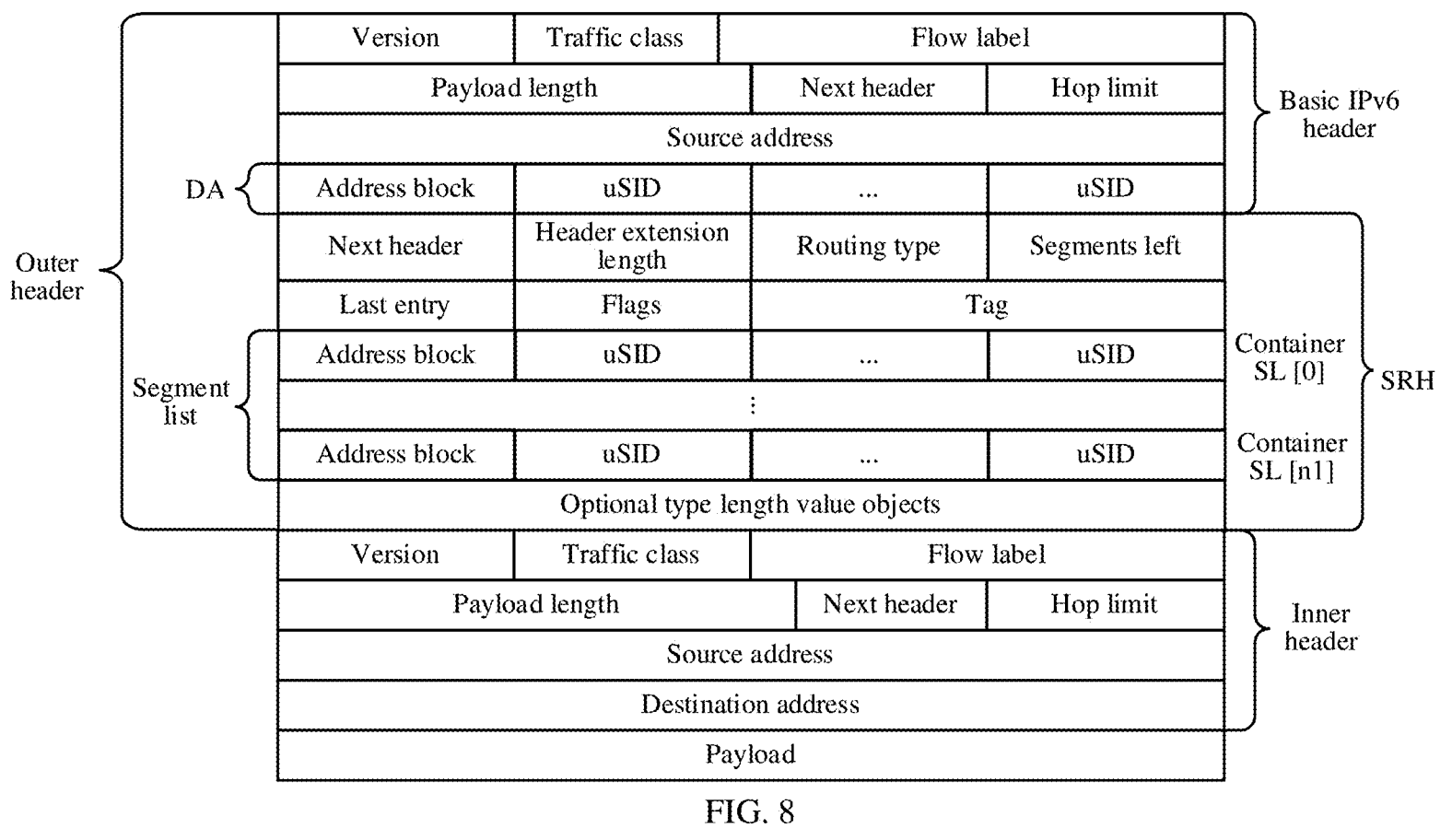

| Version | Traffic class | Flow label | | |
|---|---|---|---|---|
| Payload length | | Next header | Hop limit | |
| Source address | | | | |
| Address block | uSID | ... | uSID | |
| Next header | Header extension length | Routing type | Segments left | |
| Last entry | Flags | Tag | | |
| Address block | uSID | ... | uSID | |
| | | ... | | |
| Address block | uSID | ... | uSID | |
| Optional type length value objects | | | | |
| Version | Traffic class | Flow label | | |
| Payload length | | Next header | Hop limit | |
| Source address | | | | |
| Destination address | | | | |
| Payload | | | | |

Basic IPv6 header

SRH

Container SL [0]

Container SL [n1]

Inner header

DA

Segment list

Outer header

FIG. 8

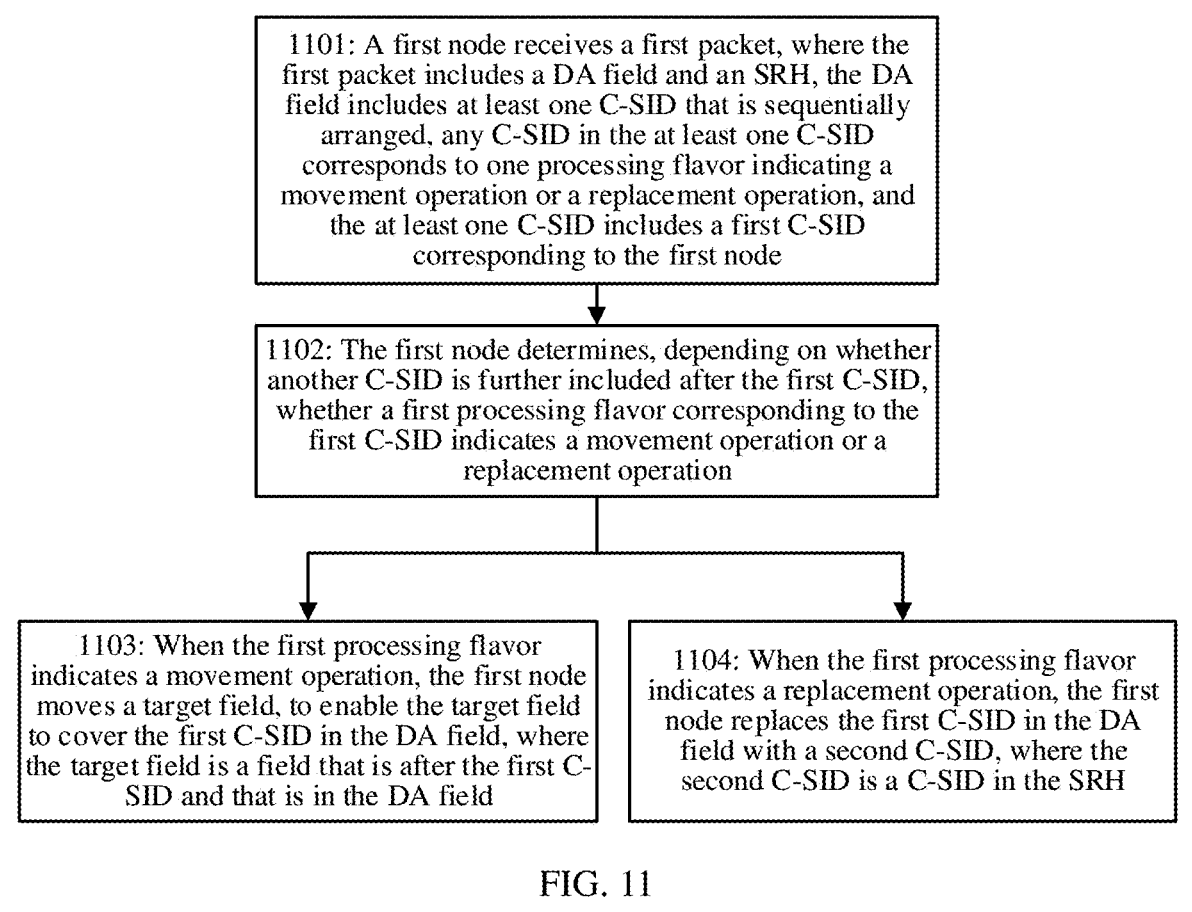

1101: A first node receives a first packet, where the first packet includes a DA field and an SRH, the DA field includes at least one C-SID that is sequentially arranged, any C-SID in the at least one C-SID corresponds to one processing flavor indicating a movement operation or a replacement operation, and the at least one C-SID includes a first C-SID corresponding to the first node 1102: The first node determines, depending on whether another C-SID is further included after the first C-SID, whether a first processing flavor corresponding to the first C-SID indicates a movement operation or a replacement operation 1103: When the first processing flavor indicates a movement operation, the first node moves a target field, to enable the target field to cover the first C-SID in the DA field, where the target field is a field that is after the first C-SID and that is in the DA field 1104: When the first processing flavor indicates a replacement operation, the first node replaces the first C-SID in the DA field with a second C-SID, where the second C-SID is a C-SID in the SRH

FIG. 11

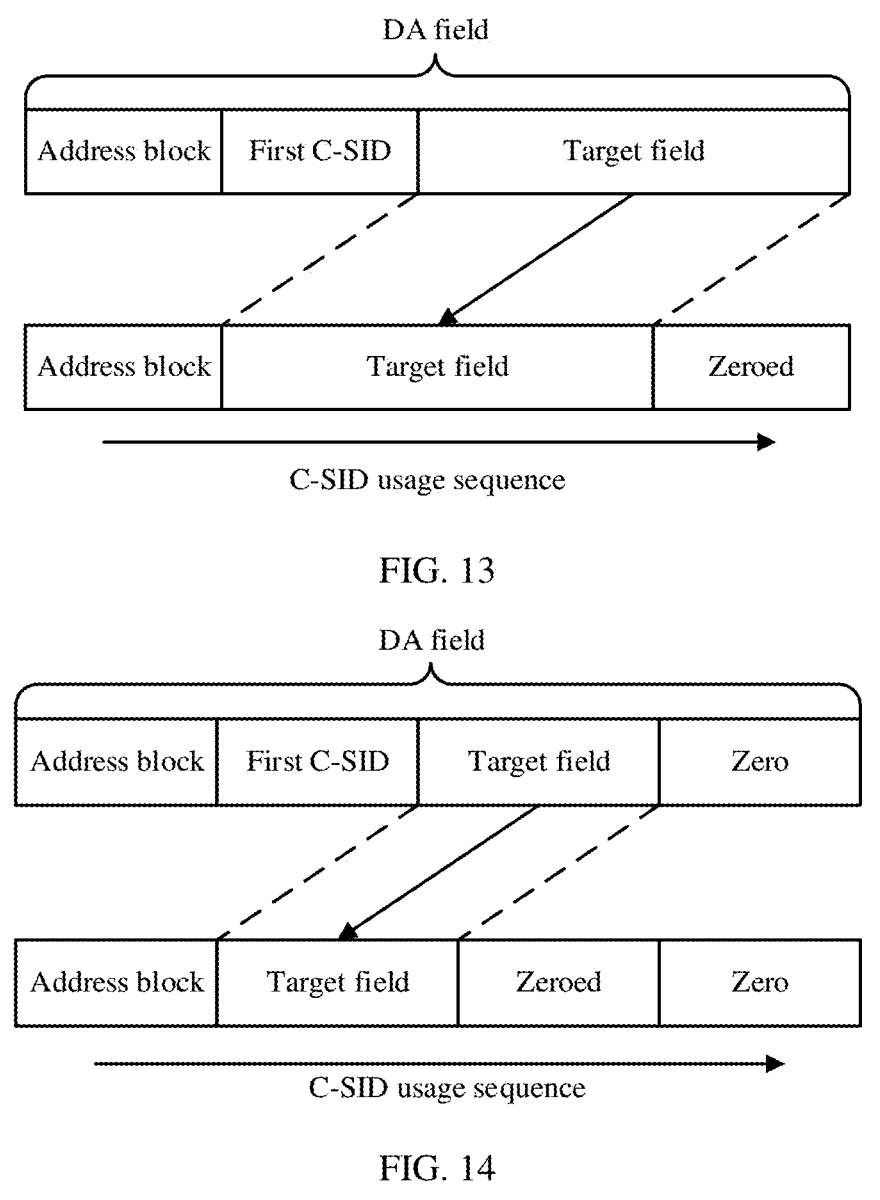

DA field

| Address block | First C-SID | Target field |
|---|---|---|

| Address block | Target field | Zeroed |
|---|---|---|

C-SID usage sequence

FIG. 13

DA field

| Address block | First C-SID | Target field | Zero |
|---|---|---|---|

| Address block | Target field | Zeroed | Zero |
|---|---|---|---|

C-SID usage sequence

FIG. 14

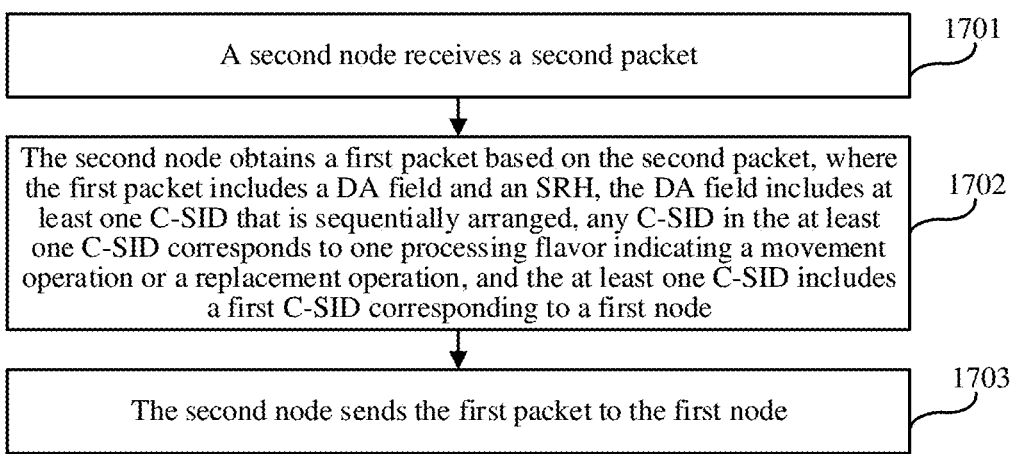

A second node receives a second packet                                    1701

The second node obtains a first packet based on the second packet, where
the first packet includes a DA field and an SRH, the DA field includes at     1702
least one C-SID that is sequentially arranged, any C-SID in the at least
one C-SID corresponds to one processing flavor indicating a movement
operation or a replacement operation, and the at least one C-SID includes
a first C-SID corresponding to a first node The second node sends the first packet to the first node                  1703

FIG. 17

PACKET PROCESSING METHOD, DEVICE, AND SYSTEM, AND COMPUTER-READABLE STORAGE MEDIUM

CROSS-REFERENCE TO RELATED APPLICATIONS

This application is a continuation of International Application No. PCT/CN2022/143305, filed on Dec. 29, 2022, which claims priority to Chinese Patent Application No. 202210510517.X, filed on May 11, 2022 and Chinese Patent Application No. 202210929197.1, filed on Aug. 3, 2022. All of the aforementioned patent applications are hereby incorporated by reference in their entireties.

TECHNICAL FIELD

This application relates to the field of communication technologies, and in particular, to a packet processing method, device, and system, and a computer-readable storage medium.

BACKGROUND

With development of communication technologies, more protocols are for processing a packet, and a segment routing (SR) protocol that refers to a source routing technology is one of the protocols. When the SR protocol is applied to an internet protocol version 6 (IPv6) data plane, the SR protocol is also referred to as IPv6 SR, namely, SRv6.

How to implement packet processing based on the SRv6 becomes a problem worthy of attention.

SUMMARY

This application provides a packet processing method, device, and system, and a computer-readable storage medium, to process a packet based on SRv6. Technical solutions provided in this application include the following aspects.

According to a first aspect, a packet processing method is provided. In this method, a first node first receives a first packet. The first packet includes a destination address (DA) field and a segment routing header (SRH). The DA field includes at least one compressed segment identifier (C-SID) that is sequentially arranged. Any C-SID in the at least one C-SID corresponds to one processing flavor indicating a movement operation or a replacement operation. The at least one C-SID includes a first C-SID corresponding to the first node. Then, the first node determines, depending on whether another C-SID is further included after the first C-SID, whether a first processing flavor corresponding to the first C-SID indicates a movement operation or a replacement operation. Further, if the first processing flavor indicates a movement operation, the first node moves a target field, to enable the target field to cover the first C-SID in the DA field. The target field is a field that is after the first C-SID and that is in the DA field. Alternatively, if the first processing flavor indicates a replacement operation, the first node replaces the first C-SID in the DA field with a second C-SID. The second C-SID is a C-SID in the SRH.

In this application, whether the first processing flavor corresponding to the first C-SID indicates a movement operation or a replacement operation is determined by determining whether another C-SID is included after the first C-SID corresponding to the first node, so that the movement operation or the replacement operation can be performed on the first packet. In this way, the first packet is flexibly processed. In addition, because the DA field in the first packet includes the at least one C-SID, C-SID compression efficiency of the first packet is high, so that packet processing efficiency of processing the first packet by the first node is also high.

In a possible implementation, that the first node determines, depending on whether another C-SID is further included after the first C-SID, whether a first processing flavor corresponding to the first C-SID indicates a movement operation or a replacement operation includes: The first node determines, based on that another C-SID is included after the first C-SID, that the first processing flavor indicates a movement operation; or the first node determines, based on that no another C-SID is included after the first C-SID, that the first processing flavor indicates a replacement operation. When another C-SID is included after the first C-SID, it indicates that there is an unused C-SID in the DA field. Therefore, a movement operation is performed, to continue to use the unused C-SID in the DA field. When no another C-SID is included after the first C-SID, it indicates that all C-SIDs in the DA field are used. Therefore, a replacement operation is performed, to continue to use an unused C-SID, namely, the second C-SID, in the SRH.

In a possible implementation, the first packet further includes a first pointer and a second pointer. Before the first node replaces the first C-SID in the DA field with the second C-SID, the method further includes: The first node updates a value of the first pointer and a value of the second pointer, to enable the value of the first pointer to indicate a location of the second C-SID in a container in which the second C-SID is located, and enable the value of the second pointer to indicate a location that is in the SRH and that is of the container in which the second C-SID is located. The first node determines the second C-SID based on the value of the first pointer and the value of the second pointer. The first node updates the value of the second pointer, so that the value of the second pointer points to a new container in the SRH. The first node updates the value of the first pointer, so that the value of the first pointer points to a new C-SID in the new container. After the update is completed, the value of the first pointer and the value of the second pointer jointly indicate the second C-SID.

In a possible implementation, the first packet further includes a first pointer and a second pointer. Before the first node replaces the first C-SID in the DA field with the second C-SID, the method further includes: The first node updates a value of the first pointer, to enable the value of the first pointer to indicate a location of the second C-SID in a container in which the second C-SID is located. The first node determines the second C-SID based on the value of the first pointer and a value of the second pointer, where value of the second pointer indicates a location that is in the SRH and that is of the container in which the second C-SID is located. The first node does not update the value of the second pointer. Therefore, a container to which the value of the second pointer points does not change. The first node updates the value of the first pointer, so that the value of the first pointer points to a new C-SID in the container. After the value of the first pointer is updated, the value of the first pointer and the value of the second pointer jointly indicate the second C-SID.

In a possible implementation, the updating a value of the first pointer includes: determining that the value of the first pointer is $N-1$, where N is a maximum quantity of C-SIDs accommodated in the container; or subtracting 1 from the value of the first pointer. A container can accommodate a maximum of N C-SIDs, and values of first pointers corresponding to the N C-SIDs are respectively 0, 1, . . . , and N−1. When the first node needs to update the value of the first pointer and the value of the second pointer, the first node determines that the value of the first pointer is N−1, and the first node further subtracts 1 from the value of the second pointer. When the first node needs to update the value of only the first pointer, the first node subtracts 1 from the value of the first pointer.

In a possible implementation, the container is included in the SRH, and a length of the container is 128 bits.

In a possible implementation, after the first node moves the target field, the method further includes: The first node sets a field that is after the moved target field and that is in the DA field to 0. The field after the moved target field is set to 0, so that a length of the DA field can be kept at a specified length, for example, 128 bits. Therefore, a packet processing error caused by an unspecified length of the DA field is avoided, and packet processing reliability is improved.

In a possible implementation, the first node stores a segment identifier (SID) table, and the SID table records a correspondence between a C-SID and a processing flavor. The method further includes: The first node queries the SID table based on the at least one C-SID. In response to that any C-SID in the at least one C-SID hits a C-SID recorded in the SID table, the first node determines that the any C-SID is the first C-SID, and determines that a processing flavor corresponding to the hit C-SID is the first processing flavor. In this application, the first node determines, by querying the local SID table, a C-SID that is in the at least one C-SID and that is the first C-SID that the first node needs to use. Correspondingly, the first node also determines, by querying the local SID table, whether the first C-SID corresponds to the first processing flavor.

In a possible implementation, the method further includes: The first node sends a packet obtained by performing the movement operation or the replacement operation. After performing the movement operation or the replacement operation, the first node may obtain a new packet different from the first packet. Therefore, the first node continues to forward the new packet, so that the packet is transmitted according to a specified forwarding path.

In a possible implementation, the processing flavor is a flavor, namely, a flavor, corresponding to a node behavior, or the processing flavor is a node behavior, namely, a behavior. The processing flavor may be in two different forms, so that flexibility of using the processing flavor is improved.

In a possible implementation, the first C-SID includes a node identifier field, a C-SID following the first C-SID includes a function field, and the C-SID following the first C-SID corresponds to the first node. The first C-SID including the node identifier field is for routing the first packet to the first node, so that the first node can receive the first packet. However, because the C-SID following the first C-SID also corresponds to the first node, after receiving the first packet, the first node may further continue to use the C-SID following the first C-SID. In this application, the node identifier field and the function field that correspond to the first node are respectively disposed in different C-SIDs, to help reduce a length of each C-SID and improve flexibility of the C-SID.

In a possible implementation, the first C-SID includes a function field, and a C-SID following the first C-SID corresponds to a downstream node of the first node in a forwarding path of the first packet. In this application, if a previous-hop node of the first node can determine that a next-hop node is the first node, a node identifier field is not required for routing the first packet to the first node. Therefore, the first C-SID may include only the function field but not the node identifier field.

In a possible implementation, the first C-SID further includes the node identifier field. In other words, the first C-SID includes both the node identifier field and the function field.

In a possible implementation, a length of the first C-SID is 16 bits or 32 bits. Therefore, 16-bit compression or 32-bit compression can be performed on the first C-SID. For example, when the first C-SID includes only the node identifier field or includes only the function field, the length of the first C-SID is 16 bits. When the first C-SID includes both the node identifier field and the function field, the length of the first C-SID is 32 bits. For another example, when the first C-SID includes both the node identifier field and the function field, the length of the first C-SID is 16 bits.

In a possible implementation, the DA field further includes an address block, and the address block is before the at least one C-SID. When querying the SID table, the first node may perform querying based on both the address block and the first C-SID. For example, longest match is performed on an SID entry based on the address block and the first C-SID.

In a possible implementation, a sum of a length of the address block and a length of the at least one C-SID is less than or equal to a length of the DA field. In other words, the DA field may be fully filled by the address block and the at least one C-SID, or may not be fully filled by the address block and the at least one C-SID. Whether the DA field is fully filled by the address block and the at least one C-SID may be selected based on an actual requirement. This is flexible.

In a possible implementation, a length of the target field is a difference between the length of the DA field and a target length, and the target length is a sum of the length of the address block and the length of the first C-SID. Alternatively, the target length is a sum of the length of the address block, the length of the first C-SID, and a length of a zeroed bit in the DA field. In other words, when the first node moves the target field, all fields after the first C-SID may be used as the target field and moved. Alternatively, the first node may use, as the target field, a field that is after the first C-SID and that carries a C-SID, and move the target field. Therefore, a process in which the first node performs the movement operation is flexible.

In a possible implementation, the first packet further includes an IPv6 packet header, and the IPv6 packet header includes the DA field. The IPv6 packet header and the SRH are two different packet headers in the first packet, and the DA field is in the IPv6 packet header.

In a possible implementation, the SRH further includes at least one SID whose length is 128 bits. In this application, hybrid compression can be performed on the C-SID and the SID, so that applicability of the packet processing method is improved.

In a possible implementation, the SRH does not include an address block corresponding to the first C-SID. Therefore, each container in the SRH can carry more C-SIDs, so that C-SID compression efficiency is improved.

According to a second aspect, a packet processing method is provided. In this method, a second node first receives a second packet. Then, the second node obtains a first packet based on the second packet, and sends the first packet to a first node. The first packet includes a DA field and an SRH.

The DA field includes at least one C-SID that is sequentially arranged. Any C-SID in the at least one C-SID corresponds to one processing flavor indicating a movement operation or a replacement operation. The at least one C-SID includes a first C-SID corresponding to the first node. In addition, a first processing flavor corresponding to the first C-SID is used by the first node to determine, depending on whether another C-SID is further included after the first C-SID, whether the first processing flavor indicates a movement operation or a replacement operation. When the first processing flavor indicates a movement operation, the first processing flavor is used by the first node to move a target field, to enable the target field to cover the first C-SID in the DA field. The target field is a field that is after the first C-SID and that is in the DA field. When the first processing flavor indicates a replacement operation, the first processing flavor is used by the first node to replace the first C-SID in the DA field with a second C-SID. The second C-SID is a C-SID in the SRH.

In a possible implementation, the processing flavor is a flavor corresponding to a node behavior, or the processing flavor is a node behavior.

In a possible implementation, the first packet further includes a first pointer. Before the second node sends the first packet to the first node, the method further includes: The second node sets a value of the first pointer to 0, where the value of the first pointer is for updating the first node, to enable the value of the first pointer to indicate a location of the second C-SID in a container in which the second C-SID is located.

In a possible implementation, the first packet further includes a second pointer. Before the second node sends the first packet to the first node, the method further includes: The second node sets a value of the second pointer to an initial value, where the initial value is a quantity of containers included in the SRH, and the value of the second pointer is for updating the first node, to enable the value of the second pointer to indicate a location that is in the SRH and that is of the container in which the second C-SID is located.

In a possible implementation, the container is included in the SRH, and a length of the container is 128 bits.

In a possible implementation, the first C-SID includes a node identifier field, a C-SID following the first C-SID includes a function field, and the C-SID following the first C-SID corresponds to the first node.

In a possible implementation, the first C-SID includes a function field, and a C-SID following the first C-SID corresponds to a downstream node of the first node in a forwarding path of the first packet.

In a possible implementation, the first C-SID further includes the node identifier field.

In a possible implementation, a length of the first C-SID is 16 bits or 32 bits.

In a possible implementation, the DA field further includes an address block, and the address block is before the at least one C-SID.

In a possible implementation, a sum of a length of the address block and a length of the at least one C-SID is less than or equal to a length of the DA field.

In a possible implementation, a length of the target field is a difference between the length of the DA field and a target length, and the target length is a sum of the length of the address block and the length of the first C-SID. Alternatively, the target length is a sum of the length of the address block, the length of the first C-SID, and a length of a zeroed bit in the DA field.

In a possible implementation, the first packet further includes an IPv6 packet header, and the IPv6 packet header includes the DA field.

In a possible implementation, the SRH further includes at least one SID whose length is 128 bits.

In a possible implementation, the SRH does not include an address block corresponding to the second C-SID.

According to a third aspect, a packet processing method is provided. The method includes: A second node receives a second packet. The second node obtains a first packet based on the second packet, where the first packet includes a DA field and an SRH. The DA field includes at least one C-SID that is sequentially arranged. Any C-SID in the at least one C-SID corresponds to one processing flavor indicating a movement operation or a replacement operation. The at least one C-SID includes a first C-SID corresponding to a first node. The second node sends the first packet to the first node. The first node receives the first packet. The first node determines, depending on whether another C-SID is further included after the first C-SID, whether a first processing flavor corresponding to the first C-SID indicates a movement operation or a replacement operation. When the first processing flavor indicates a movement operation, the first node moves a target field, to enable the target field to cover the first C-SID in the DA field. The target field is a field that is after the first C-SID and that is in the DA field. When the first processing flavor indicates a replacement operation, the first node replaces the first C-SID in the DA field with a second C-SID. The second C-SID is a C-SID in the SRH.

According to a fourth aspect, a packet processing apparatus is provided. The packet processing apparatus is used in a first node, and the apparatus includes:

a receiving module, configured to receive a first packet, where the first packet includes a DA field and an SRH, the DA field includes at least one C-SID that is sequentially arranged, any C-SID in the at least one C-SID corresponds to one processing flavor indicating a movement operation or a replacement operation, and the at least one C-SID includes a first C-SID corresponding to the first node;

a determining module, configured to determine, depending on whether another C-SID is further included after the first C-SID, whether a first processing flavor corresponding to the first C-SID indicates a movement operation or a replacement operation;

a movement module, configured to: when the first processing flavor indicates a movement operation, move a target field, to enable the target field to cover the first C-SID in the DA field, where the target field is a field that is after the first C-SID and that is in the DA field; and a replacement module, configured to: when the first processing flavor indicates a replacement operation, replace the first C-SID in the DA field with a second C-SID, where the second C-SID is a C-SID in the SRH.

In some possible implementations, the determining module is configured to: determine, based on that another C-SID is included after the first C-SID, that the first processing flavor indicates a movement operation; or determine, based on that no another C-SID is included after the first C-SID, that the first processing flavor indicates a replacement operation.

In some possible implementations, the first packet further includes a first pointer and a second pointer. The replacement module is further configured to update a value of the first pointer and a value of the second pointer, to enable the value of the first pointer to indicate a location of the second C-SID in a container in which the second C-SID is located, and enable the value of the second pointer to indicate a location that is in the SRH and that is of the container in which the second C-SID is located; and determine the second C-SID based on the value of the first pointer and the value of the second pointer.

In a possible implementation, the first packet further includes a first pointer and a second pointer. The replacement module is configured to update a value of the first pointer, to enable the value of the first pointer to indicate a location of the second C-SID in a container in which the second C-SID is located; and determine the second C-SID based on the value of the first pointer and a value of the second pointer, where the value of the second pointer indicates a location that is in the SRH and that is of the container in which the second C-SID is located.

In some possible implementations, the replacement module is configured to determine that the value of the first pointer is N−1, where N is a maximum quantity of C-SIDs accommodated in the container; or subtract 1 from the value of the first pointer.

In some possible implementations, the container is included in the SRH, and a length of the container is 128 bits.

In some possible implementations, the movement module is further configured to set a field that is after the moved target field and that is in the DA field to 0.

In some possible implementations, the first node stores an SID table, and the SID table records a correspondence between a C-SID and a processing flavor. The determining module is further configured to query the SID table based on the at least one C-SID; and in response to that any C-SID in the at least one C-SID hits a C-SID recorded in the SID table, determine that the any C-SID is the first C-SID, and determine that a processing flavor corresponding to the hit C-SID is the first processing flavor.

In some possible implementations, the apparatus further includes a sending module, configured to send a packet obtained by performing the movement operation or the replacement operation.

In some possible implementations, the processing flavor is a flavor corresponding to a node behavior, or the processing flavor is a node behavior.

In some possible implementations, the first C-SID includes a node identifier field, a C-SID following the first C-SID includes a function field, and the C-SID following the first C-SID corresponds to the first node.

In some possible implementations, the first C-SID includes a function field, and a C-SID following the first C-SID corresponds to a downstream node of the first node in a forwarding path of the first packet.

In some possible implementations, the first C-SID further includes the node identifier field.

In some possible implementations, a length of the first C-SID is 16 bits or 32 bits.

In some possible implementations, the DA field further includes an address block, and the address block is before the at least one C-SID.

In some possible implementations, a sum of a length of the address block and a length of the at least one C-SID is less than or equal to a length of the DA field.

In some possible implementations, a length of the target field is a difference between the length of the DA field and a target length, and the target length is a sum of the length of the address block and the length of the first C-SID.

Alternatively, the target length is a sum of the length of the address block, the length of the first C-SID, and a length of a zeroed bit in the DA field.

In some possible implementations, the first packet further includes an IPv6 packet header, and the IPv6 packet header includes the DA field.

In some possible implementations, the SRH further includes at least one SID whose length is 128 bits.

In some possible implementations, the SRH does not include an address block corresponding to the first C-SID.

According to a fifth aspect, a packet processing apparatus is provided. The packet processing apparatus is used in a second node, and the apparatus includes:

a receiving module, configured to receive a second packet;

an obtaining module, configured to obtain a first packet based on the second packet, where the first packet includes a destination address DA field and a segment routing header SRH, the DA field includes at least one compressed segment identifier C-SID that is sequentially arranged, any C-SID in the at least one C-SID corresponds to one processing flavor indicating a movement operation or a replacement operation, and the at least one C-SID includes a first C-SID corresponding to a first node; and a sending module, configured to send the first packet to the first node.

A first processing flavor corresponding to the first C-SID is used by the first node to determine, depending on whether another C-SID is further included after the first C-SID, whether the first processing flavor indicates a movement operation or a replacement operation. When the first processing flavor indicates a movement operation, the first processing flavor is used by the first node to move a target field, to enable the target field to cover the first C-SID in the DA field. The target field is a field that is after the first C-SID and that is in the DA field. When the first processing flavor indicates a replacement operation, the first processing flavor is used by the first node to replace the first C-SID in the DA field with a second C-SID. The second C-SID is a C-SID in the SRH.

In some possible implementations, the processing flavor is a flavor corresponding to a node behavior, or the processing flavor is a node behavior.

In some possible implementations, the first packet further includes a first pointer. The sending module is further configured to set a value of the first pointer to 0, where the value of the first pointer is for updating the first node, to enable the value of the first pointer to indicate a location of the second C-SID in a container in which the second C-SID is located.

In some possible implementations, the first packet further includes a second pointer. The sending module is further configured to set a value of the second pointer to an initial value, where the initial value is a quantity of containers included in the SRH, and the value of the second pointer is for updating the first node, to enable the value of the second pointer to indicate a location that is in the SRH and that is of the container in which the second C-SID is located.

In some possible implementations, the container is included in the SRH, and a length of the container is 128 bits.

In some possible implementations, the first C-SID includes a node identifier field, a C-SID following the first C-SID includes a function field, and the C-SID following the first C-SID corresponds to the first node.

In some possible implementations, the first C-SID includes a function field, and a C-SID following the first C-SID corresponds to a downstream node of the first node in a forwarding path of the first packet.

In some possible implementations, the first C-SID further includes the node identifier field.

In some possible implementations, a length of the first C-SID is 16 bits or 32 bits.

In some possible implementations, the DA field further includes an address block, and the address block is before the at least one C-SID.

In some possible implementations, a sum of a length of the address block and a length of the at least one C-SID is less than or equal to a length of the DA field.

In some possible implementations, a length of the target field is a difference between the length of the DA field and a target length, and the target length is a sum of the length of the address block and the length of the first C-SID. Alternatively, the target length is a sum of the length of the address block, the length of the first C-SID, and a length of a zeroed bit in the DA field.

In some possible implementations, the first packet further includes an IPv6 packet header, and the IPv6 packet header includes the DA field.

In some possible implementations, the SRH further includes at least one SID whose length is 128 bits.

In some possible implementations, the SRH does not include an address block corresponding to the second C-SID.

According to a sixth aspect, a packet processing device is provided. The device includes a memory and a processor. The memory stores at least one instruction, and the at least one instruction is loaded and executed by the processor, to enable the device to implement the methods in the foregoing aspects.

Optionally, there are one or more processors, and there are one or more memories.

Optionally, the memory and the processor may be integrated together, or the memory and the processor may be separately disposed.

According to a seventh aspect, a packet processing system is provided. The system includes a first node and a second node. The first node is configured to perform the packet processing method provided in the first aspect and the possible implementations corresponding to the first aspect. The second node is configured to perform the packet processing method provided in the second aspect and the possible implementations corresponding to the second aspect.

According to an eighth aspect, a computer-readable storage medium is provided. The computer-readable storage medium stores at least one instruction, and the instruction is loaded and executed by a processor, to enable a computer to implement the methods in the foregoing aspects.

According to a ninth aspect, a computer program product is provided. The computer program product includes a computer program or instructions, and the computer program or the instructions are executed by a processor, to enable a computer to implement the methods in the foregoing aspects.

According to a tenth aspect, a chip is provided, including a processor, configured to invoke, from a memory, instructions stored in the memory, and run the instructions, to enable a computer in which the chip is installed to perform the methods in the foregoing aspects.

According to an eleventh aspect, another chip is provided, including an input interface, an output interface, a processor, and a memory. The input interface, the output interface, the processor, and the memory are connected through an internal connection path. The processor is configured to execute code in the memory, and when the code is executed, a computer in which the chip is installed performs the methods in the foregoing aspects.

It should be understood that, for beneficial effects achieved by the technical solutions of the second aspect to the eleventh aspect and corresponding possible implementations of the technical solutions of the second aspect to the eleventh aspect of this application, refer to the technical effects of the first aspect and the possible implementations corresponding to the first aspect. Details are not described herein again.

BRIEF DESCRIPTION OF THE DRAWINGS

FIG. 8 is a schematic diagram of a structure of a packet that is generated based on a micro SID (uSID) technology and that is encapsulated with a packet header according to an embodiment of this application;

FIG. 11 is a flowchart of a packet processing method according to an embodiment of this application;

FIG. 13 is a schematic diagram of moving a target field according to an embodiment of this application;

FIG. 14 is another schematic diagram of moving a target field according to an embodiment of this application;

FIG. 17 is a flowchart of another packet processing method according to an embodiment of this application;

DETAILED DESCRIPTION OF ILLUSTRATIVE EMBODIMENTS

Terms used in embodiments of this application are only used to explain specific embodiments of this application, but are not intended to limit this application.

Figure 1:
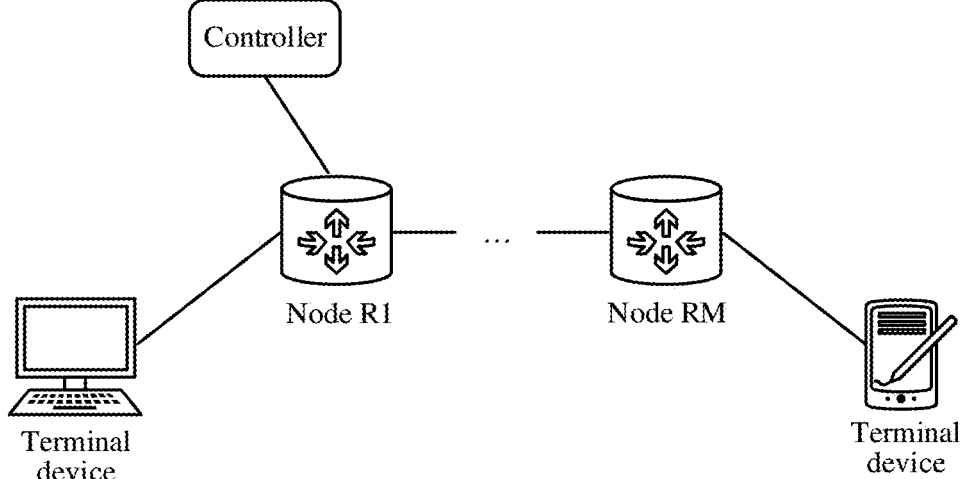
FIG. 1 is a schematic diagram of an implementation environment according to an embodiment of this application.

An embodiment of this application provides an implementation environment. As shown in FIG. 1, the implementation environment includes at least one SRv6 domain. The at least one SRv6 domain includes a controller and a plurality of nodes R1 to RM. M may be a positive integer greater than or equal to 2, and a value of M is not limited herein. The plurality of nodes are communicatively connected. A node at an edge in the plurality of nodes may serve as a head node, and the controller is communicatively connected to the head node. The implementation environment further includes a terminal device, and the terminal device is also communicatively connected to the head node.

For example, the node is a network device or a chip. The network device is, for example, a router, a switch, a forwarder, or a virtual machine. This is not limited herein. For example, the terminal device is, for example, a personal computer, a mobile phone, or a tablet computer. This is not limited herein either.

In the implementation environment shown in FIG. 1, the terminal device is configured to send a packet to the head node, and the controller is configured to deliver packet transmission path information to the head node. The head node is configured to: after receiving the packet sent by the terminal device, generate a packet header based on the packet transmission path information delivered by the controller, encapsulate the packet header into an outer layer of the packet, and send a packet encapsulated with the packet header. Therefore, the packet encapsulated with the packet header can be transmitted based on the packet transmission path information.

For example, the controller obtains network topology information of a plurality of nodes. The network topology information indicates a communication connection relationship between the plurality of nodes. For example, the plurality of nodes exchange the network topology information with the controller by using a network topology information extraction technology such as a border gateway protocol (BGP) link state (LS), for example, actively report the network topology information to the controller by using the BGP LS technology, or feed back the network topology information to the controller by using the BGP LS technology based on an instruction sent by the controller.

Then, the controller performs path computation based on the network topology information of the plurality of nodes and a service requirement, to obtain an SRv6 policy. The SRv6 policy includes at least one candidate path between the head node and a destination node, and each candidate path includes at least one group of packet transmission path information. In this way, the controller delivers the SRv6 policy to the head node, to deliver the packet transmission path information to the head node. For example, the service requirement includes but is not limited to a requirement on at least one of a latency and a bandwidth. This is not limited herein. For example, the service requirement may be indicated by a color. The color is in one-to-one correspondence with the service requirement, and the color is also in one-to-one correspondence with the SRv6 policy.

Figure 2:
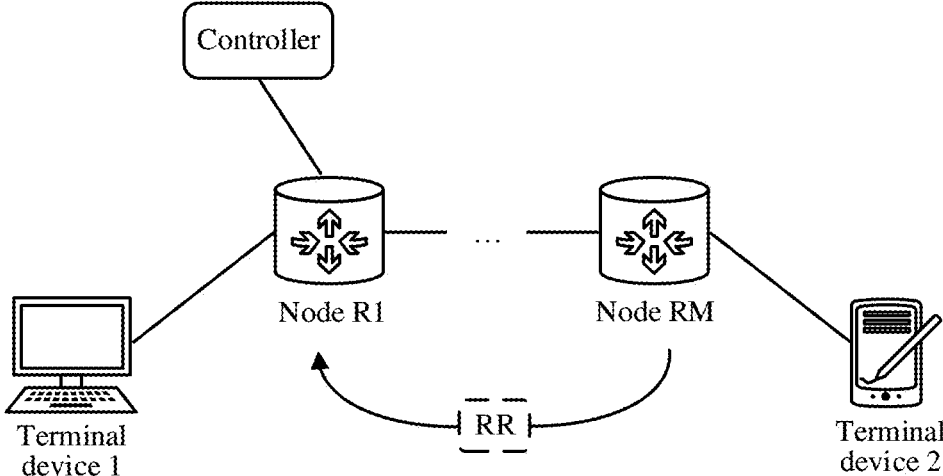
FIG. 2 is a schematic diagram of another implementation environment according to an embodiment of this application.

For example, refer to FIG. 2. FIG. 2 shows an example implementation environment. A head node is R1, a destination node is a terminal device 2, and packet transmission path information included in an SRv6 policy indicates that a previous hop of the terminal device 2 is a node RM. After a controller delivers, to R1, an SRv6 policy corresponding to a specified color, RM advertises, to R1, a route corresponding to the same specified color. The route includes a prefix and a next hop, and the next hop is the terminal device 2. For example, RM may directly advertise the route to R1, or may advertise the route to a route reflector (RR) shown in FIG. 2, to reflect the route to R1 via the RR. After receiving the route, R1 associates the route with the SRv6 policy because the route and the SRv6 policy correspond to the same specified color. After receiving a packet whose DA field is the terminal device 2 and that is sent by the terminal device 1, R1 performs querying based on the DA field of the packet to obtain the route, and then obtains the SRv6 policy associated with the route. Therefore, R1 may divert the packet to the SRv6 policy associated with the route, to color the packet based on the color corresponding to the SRv6 policy. In other words, R1 generates a packet header based on packet transmission path information included in the SRv6 policy associated with the route, encapsulates the packet header into an outer layer of the packet, and sends a packet encapsulated with the packet header.

Certainly, this manner of performing traffic diversion based on the color is merely an example, and is not used to limit a manner of implementing traffic diversion by the head node. After receiving the packet sent by the terminal device, the head node may alternatively determine, in another possible manner, the SRv6 policy for transmitting the packet, to determine the packet transmission path information, so as to send, based on the foregoing descriptions, the packet encapsulated with the packet header.

The packet transmission path information delivered by the controller to the head node includes a plurality of ordered SIDs. Each SID indicates a node and a node behavior that the node needs to perform. The node behavior is also referred to as an action. A length of each SID is 128 bits.

Figure 3:
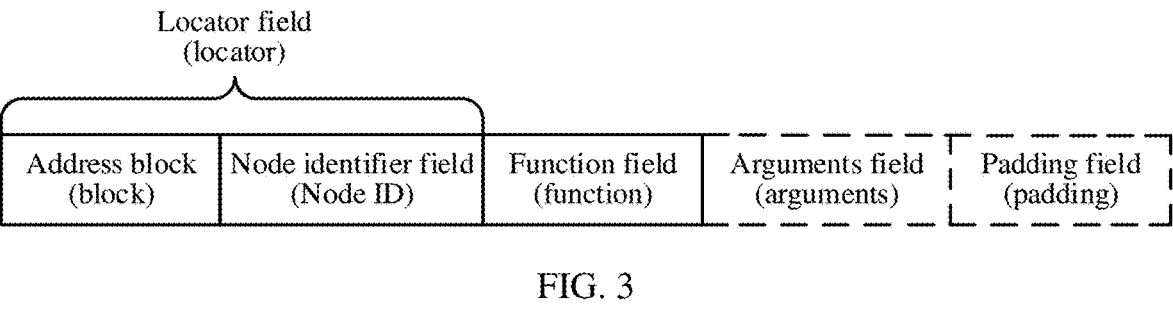
FIG. 3 is a schematic diagram of a structure of an SID according to an embodiment of this application.

FIG. 3 shows a structure of an SID. An SID includes a locator field and a function field. The locator field is for carrying a locator network segment route, and the locator network segment route indicates a node. The locator field may be further divided into an address block and a node identifier (Node ID) field. The address block is also referred to as a public prefix (common prefix). In a same SRv6 domain, different nodes have a same address block and different node identifier fields. Therefore, the different nodes can be distinguished based on the node identifier fields. The function field is for carrying an operation code (opcode), and the operation code indicates a node behavior that needs to be performed.

For example, as shown in FIG. 3, the SID may further include an arguments field and a padding field. The arguments field is for carrying an argument related to a node behavior, and the arguments field may be set to 0. The padding field is for enabling a length of the SID to be 128 bits, to be specific, supplementing a part after the locator field, the function field, and the optional arguments field. The padding field exists when a sum of lengths of the locator field, the function field, and the arguments field is less than 128 bits, and the padding field may be set to 0.

After receiving the packet transmission path information, that is, after receiving the plurality of ordered SIDs, the head node needs to generate the packet header. The head node needs to compress the plurality of ordered SIDs into the packet header, so that the packet header carries the plurality of ordered SIDs. Then, the packet header is encapsulated into the outer layer of the packet, to obtain the packet encapsulated with the packet header. Therefore, after the head node sends the packet encapsulated with the packet header, because the packet header carries the plurality of ordered SIDs, the packet encapsulated with the packet header may be forwarded hop by hop by a plurality of ordered nodes indicated by the plurality of ordered SIDs, so that the packet encapsulated with the packet header is transmitted based on the foregoing packet transmission path information.

Figure 4:
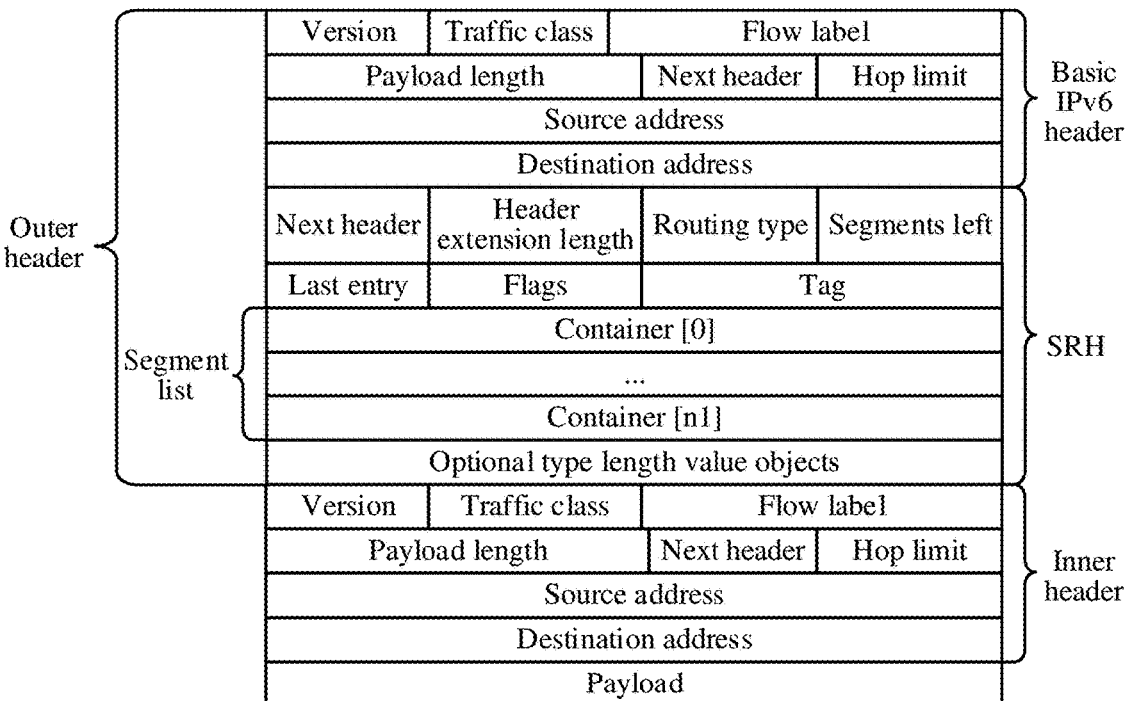
FIG. 4 is a schematic diagram of a structure of a packet encapsulated with a packet header according to an embodiment of this application.

For a structure of the packet encapsulated with the packet header, refer to FIG. 4. The structure includes an outer packet header, an inner packet header, and a payload. The inner packet header is a packet header carried in the packet sent by the terminal device to the head node. The inner packet header includes but is not limited to an IPv6 packet header, an internet protocol version 4 (IPv4) packet header, or the like. The payload is a payload carried in the packet sent by the terminal device to the head node. The outer packet header is the packet header generated by the head node based on the packet transmission path information.

The outer packet header includes an IPv6 basic packet header and an SRH. Both the IPv6 basic packet header and the inner packet header include a version (V) field, a traffic class (TC) field, a flow label (FL) field, a payload length (PL) field, a next header (NH) field, a hop limit (HL) field, a source address (SA) field, and a DA field. The SRH includes a next header field, a header extension length (HEL) field, a routing type (RT) field, a segments left (SL) field, a last entry (LE) field, a flags (F) field, a tag (T) field, a segment list, and an optional type length value (TLV) objects field.

The segment list of the SRH includes a plurality of ordered containers. A length of each container is 128 bits, and each container is for carrying one SID, so that the segment list is for carrying the foregoing plurality of ordered SIDs. A use order of the plurality of containers is a reverse order of an arrangement order of the plurality of containers. For example, in FIG. 4, a container SL [n1] arranged in a last place is first used, and a container SL [0] arranged in a first place is last used. A value of n1 is a total quantity of containers minus 1.

However, when the plurality of ordered SIDs are compressed into a packet header, in other words, the plurality of ordered SIDs are carried by using the segment list, a length of the packet header is increased. As a result, a length of the packet encapsulated with the packet header is increased. Consequently, a large quantity of transmission resources are consumed to transmit, between different nodes, the packet encapsulated with the packet header, and packet processing efficiency of processing the packet encapsulated with the packet header by each node is affected. Therefore, a conventional technology 1 and a conventional technology 2 each provide a solution, to reduce a length of a packet header, so as to reduce processing resources required for transmission and improve packet processing efficiency. The following separately describes the two conventional technologies.

The solution provided in the conventional technology 1 is a G-SRv6 technology. In the G-SRv6 technology, a head node uses the address block, the arguments field, and the padding field as redundant information, retains the 1st SID in the plurality of ordered SIDs, deletes the redundant information from each SID other than the 1st SID, and uses the remaining node identifier field and function field as a C-SID. In comparison with the SID, a length of the C-SID is smaller, so that a 128-bit container can carry at least two C-SIDs.

In the G-SRv6 technology, the 1st SID is used first, and then the C-SID in each container is used. A use order of different containers is the same as that described above, and a use order of the plurality of containers is still a reverse order of an arrangement order of the plurality of containers. In one container, a use order of the at least two C-SIDs is a reverse order of an arrangement order of the at least two C-SIDs. For example, refer to FIG. 5. In one container, a first used C-SID is a C-SID [n2] arranged in a low bit of the container, and a last used C-SID is a C-SID [0] arranged in a high bit of the container. A value of n2 is a total quantity of C-SIDs carried in the container minus 1, in other words, the value of n2 is a maximum quantity of C-SIDs that can be carried in the container minus 1.

Figure 5:
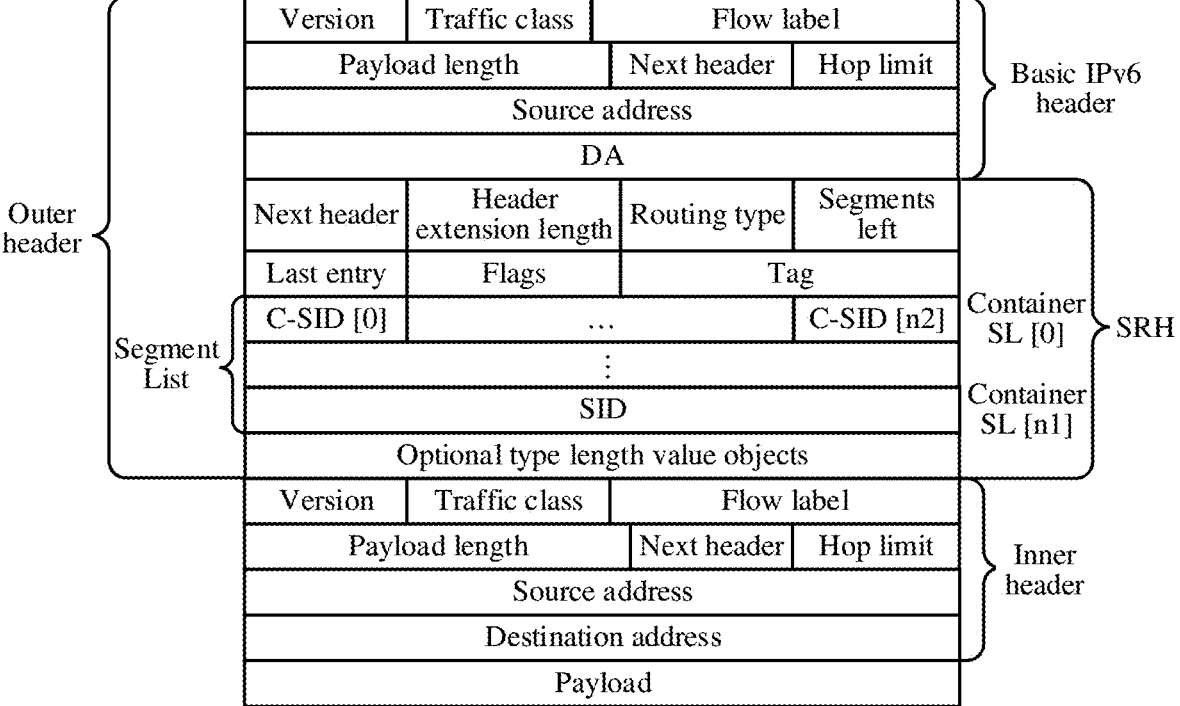
FIG. 5 is a schematic diagram of a structure of a packet that is generated based on a generalized SRv6 (G-SRv6) technology and that is encapsulated with a packet header according to an embodiment of this application.

Still refer to FIG. 5. FIG. 5 shows a structure of a packet that is generated by a head node based on the G-SRv6 technology and that is encapsulated with a packet header. The 1st container, namely, a container SL [n1], in a segment list of an SRH carries an SID whose length is 128 bits. The SID is the 1st SID in the foregoing plurality of ordered SIDs, and the SID includes an address block, a node identifier field, a function field, and an arguments field. A container other than the 1st container carry a C-SID. After generating the packet encapsulated with the packet header, the head node copies, to a DA field, the 128-bit SID carried in the 1st container, and then queries a routing table based on the DA field, to send the packet encapsulated with the packet header.

Figure 6:
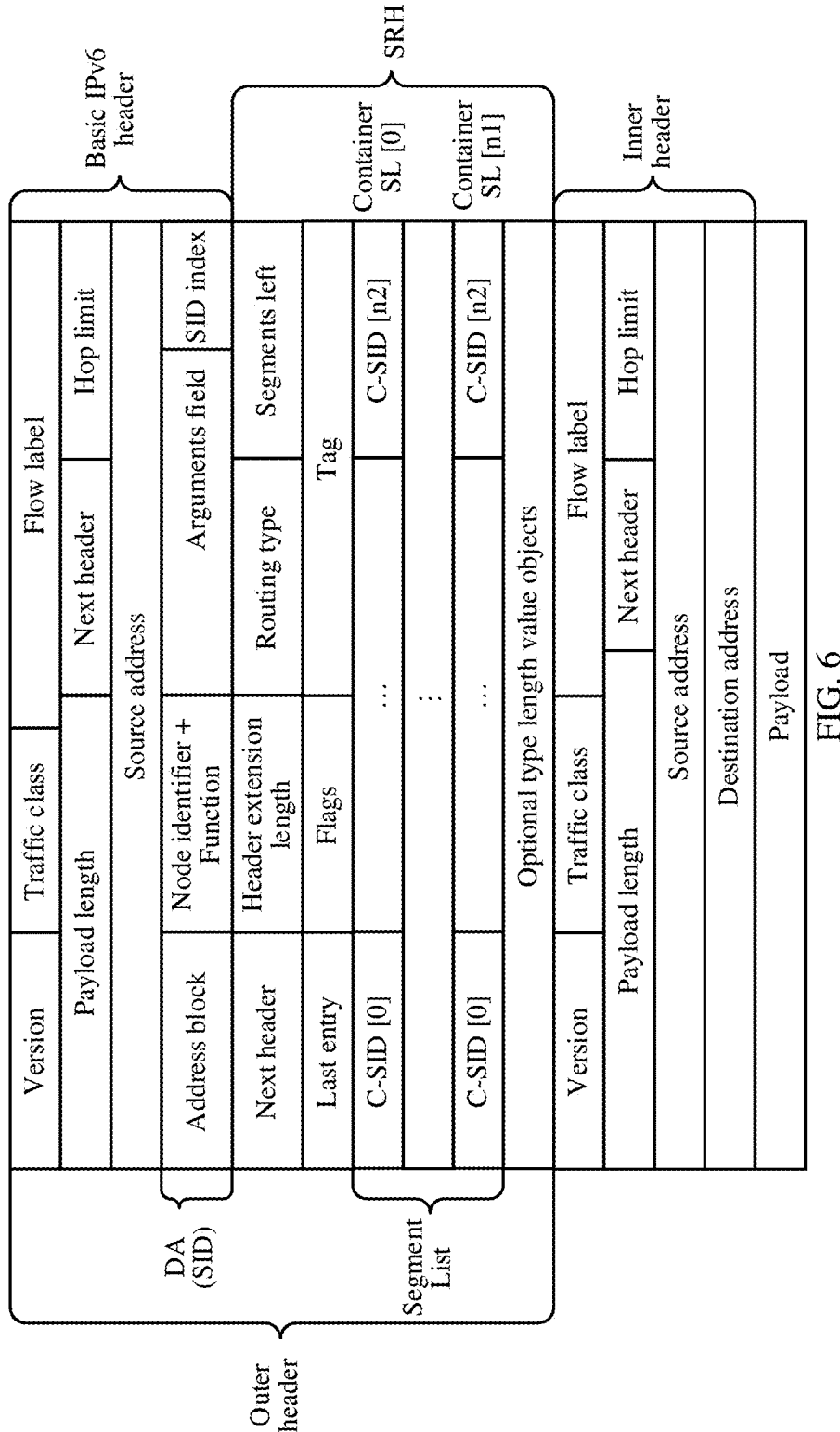
FIG. 6 is a schematic diagram of a structure of another packet that is generated based on a G-SRv6 technology and that is encapsulated with a packet header according to an embodiment of this application.

Alternatively, FIG. 6 shows another structure of a packet that is generated by a head node based on the G-SRv6 technology and that is encapsulated with a packet header. In comparison with the case shown in FIG. 5, in a case shown in FIG. 6, the 128-bit SID is not located in the 1st container of the segment list of the SRH, but is directly in the DA field. In other words, the DA field carries a 128-bit SID, and the SID includes an address block, a node identifier field, a function field, and an arguments field. Each container in the segment list of the SRH carries a C-SID. After generating the packet encapsulated with the packet header, the head node directly queries a routing table based on the DA field, and sends the packet encapsulated with the packet header.

It can be learned that, in comparison with the case shown in FIG. 5, in the case shown in FIG. 6, the head node directly disposes, in the DA field, the SID whose length is 128 bits, so that a quantity of containers included in the segment list of the SRH can be reduced. In other words, a value of n1 in the case shown in FIG. 6 may be less than a value of n1 in the case shown in FIG. 5. Because the quantity of containers can be reduced in the case shown in FIG. 6, the case shown in FIG. 6 belongs to a reduce mode, and the case shown in FIG. 5 belongs to a non-reduce mode.

In the G-SRv6, a continuation of compression (COC) flavor is further defined, to use with the C-SID. The 1st SID in the plurality of ordered SIDs corresponds to the COC flavor, and a C-SID other than a last C-SID in each C-SID corresponds to a COC flavor. For the SID or C-SID corresponding to the COC flavor, the COC flavor indicates that a next C-SID of the SID or C-SID corresponding to the COC flavor in the segment list needs to be updated to the DA field, so that the node identifier field and the function field in the DA field are replaced with the next C-SID. It should be understood that, when the DA field carries the 128-bit SID, the next C-SID replaces the node identifier field and the function field of the SID. When the DA field carries the address block, the C-SID, and the like, the next C-SID replaces the C-SID. It can be learned that the COC flavor indicates a replacement operation.

If a node identifier field included in an SID or a C-SID indicates a node, a correspondence between an index entry and a node behavior is recorded in a locally stored SID table of the node. The index entry is, for example, an address block, a node identifier field, and a function field. If the SID or the C-SID corresponds to a COC flavor, the SID table records not only the correspondence between the index entry and the node behavior, but also a correspondence between the index entry and a COC flavor.

Correspondingly, after receiving the packet encapsulated with the packet header, a node other than the head node query, based on the address block, the node identifier field, and the function field that are included in the DA field, the SID table locally stored in the node. If an index entry in the SID table is hit, a node behavior corresponding to the index entry recorded in the SID table may be obtained, or a node behavior and a COC flavor that correspond to the index entry recorded in the SID table may be obtained. If the node behavior and the COC flavor that correspond to the index entry recorded in the SID table are obtained, it indicates that the SID or C-SID included in the DA field corresponds to the COC flavor. In this case, the node needs to determine a next C-SID of the SID or C-SID included in the DA field in the segment list, and replace the node identifier field and the function field C-SID that are included in the DA field with the next C-SID. This is equivalent to obtaining a new packet encapsulated with the packet header. Then, the new packet encapsulated with the packet header is forwarded based on the node behavior corresponding to the index entry recorded in the SID table.

In addition, in the G-SRv6, a two-dimensional pointer is further defined, to use with the COC flavor and the C-SID. The two-dimensional pointer may indicate a position of a C-SID in a segment list. The two-dimensional pointer includes an SL field and a SID index (SI) field. A value of the SL field indicates a location that is of a container in which a C-SID is located and that is in a segment list, and a value of the SI field indicates a location that is of the C-SID and that is in the container indicated by the SL field. As shown in FIG. 6, the SI field may be in several lowest bits in an arguments field included in a DA field. For example, the SI field may be in last two or three bits of the arguments field. In addition, the arguments field may be extended to a last bit of the DA field, that is, the arguments field is extended to 128 bits. In this case, the SI field in the several lowest bits in the arguments field is also in several lowest bits in the DA field. Certainly, the SID in which arguments field is located has a type. Whether the arguments field is extended to the last bit of the DA field may be defined based on a format of the SID of this type in a related protocol.

In the packet that is sent by the head node and that is encapsulated with the packet header, both the value of the SL field and the value of the SI field are initial values. The initial value of the SL field is equal to a total quantity of containers, and the initial value of the SI field is 0. After receiving the packet encapsulated with the packet header, a node other than the head node may update the value of the SI field and the value of the SL field, to determine a next C-SID of the SID or C-SID included in the DA field in the segment list. The next C-SID is a C-SID to which an updated value of the SI field and an updated value of the SL field point. If a value of an SI field in a packet received by a node is 0, the value of the SI field is initialized, so that the value of the SI field is equal to a maximum quantity of C-SIDs that can be included in a container minus 1, and a value of an SL field is subtracted by 1. Alternatively, if a value of an SI field in a packet received by a node is not 0, only the value of the SI field is subtracted by 1, and a value of an SL field is not updated.

Figure 7:
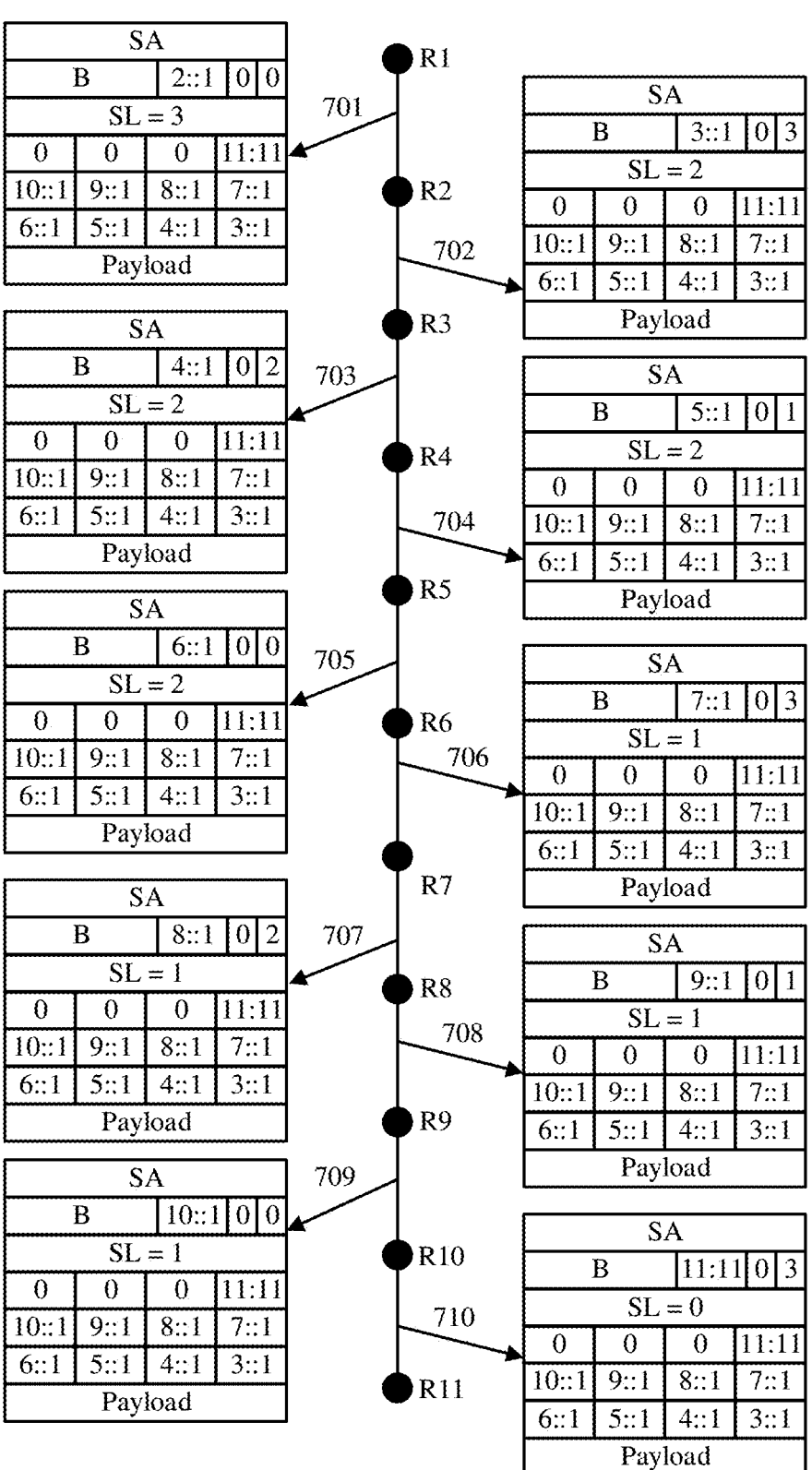
FIG. 7 is a schematic flowchart of a packet processing process that is based on a G-SRv6 technology according to an embodiment of this application.

With reference to FIG. 7, the following comprehensively describes a process of processing a packet based on the G-SRv6 technology. In comparison with the packets shown in FIG. 5 and FIG. 6, some fields are omitted in each packet shown in FIG. 7, and only an SA field and a DA field (where B in the DA field represents an address block) in an IPv6 basic packet header, an SL field in an SRH, and a container and a payload in a segment list are displayed, to ensure brevity of FIG. 7. FIG. 7 includes 11 nodes R1 to R11, where R1 is a head node. A node identifier field and a function field that are included in the 1st 128-bit SID are 2::1, middle C-SIDs are 3::1 to 10::1, and a last C-SID is 11:11. Each C-SID is 32 bits. The 1st 128-bit SID and 3::1 to 10::1 correspond to a COC flavor, but 11:11 does not correspond to the COC flavor.

A packet received by R1 includes an inner packet header (not shown in FIG. 7) and a payload. R1 encapsulates a packet header at an outer layer of the packet in a reduce mode, to obtain a packet encapsulated with the packet header, that is, a packet 701 shown in FIG. 7. In the packet 701, a DA field includes the 1st 128-bit SID. A segment list in an SRH includes three containers in total, where n1=2. 3::1 to 6::1 are in a container [2]. 7::1 to 10::1 are in a container [1]. 11:11 is in a container [0]. All fields except 11:11 in the container [0] are padding fields, and the padding fields are set to 0. One container may carry four C-SIDs, where n2=3. 3::1, 7::1, and 11:11 are a C-SID [3], 4::1 and 8::1 are a C-SID [2], 5::1 and 9::1 are a C-SID [1], and 6::1 and 10::1 are a C-SID [0]. In addition, a value of an SI field is an initial value, and SI=0. A value of an SL field is also an initial value, and SL=3. Then, R1 queries a routing table based on the address block and 2::1 in the DA field, to forward the packet, so that R2 indicated by a node identifier field included in 2::1 receives the packet 701 shown in FIG. 7. It should be understood that, that R1 uses the reduce mode is merely an example, and R1 may alternatively use a non-reduce mode based on an actual requirement.

After receiving the packet 701, the R2 queries a local SID table of the R2 based on the address block and 2::1 in the DA field, hits an index entry recorded in the SID table, and obtains a COC flavor and a node behavior that correspond to the hit index entry. Therefore, the R2 determines that the SID carried in the DA field corresponds to the COC flavor. Because the COC flavor indicates a replacement operation, the R2 needs to replace 2::1 in the DA field with a next C-SID of 2::1.

Because SI=0 in the packet 701 received by R2, R2 initializes the value of the SI field to 3, to obtain SI=3, and subtracts the value of the SL field by 1, to obtain SL=3−1=2. In this way, R2 hits the container [2] based on SL=2, and hits the C-SID [3] based on SI=3, to determine that the next C-SID is the C-SID [3], namely, 3::1, in the container [2].

Then, R2 replaces 2::1 in the DA field with 3::1, to obtain a packet 702 shown in FIG. 7, and forwards the packet based on the node behavior obtained by querying the SID table, so that R3 indicated by a node identifier field included in 3::1 receives the packet 702.

After receiving the packet 702, R3 queries a local SID table of R3 to determine that 3::1 in the DA field corresponds to a COC flavor and a node behavior. Because SI=3 in the packet received by R3, R3 only subtracts the value of the SI field by 1, to obtain SI=3−1=2, and keeps the value of the SL field unchanged, to obtain SL=2. In this way, R3 determines that a next C-SID is 4::1, replaces 3::1 in the DA field with 4::1, to obtain a packet 703 shown in FIG. 7, and then forwards the packet based on the foregoing node behavior, so that R4 indicated by a node identifier field included in 4::1 receives the packet 703.

After receiving the packet 703, R4 queries a local SID table of R4 to determine that 4::1 in the DA field corresponds to a COC flavor and a node behavior. R4 calculates SI=2−1=0 and SL=2, and determines that a next C-SID is 5::1. R4 replaces 4::1 in the DA field with 5::1, to obtain a packet 704 shown in FIG. 7. Then, R4 forwards the packet based on the foregoing node behavior, so that R5 receives the packet 704.

A principle of performing packet forwarding by R5 to R10 is the same as that described above. Packets that are sent by R5 to R10 and that are encapsulated with packet headers are respectively a packet 705, a packet 706, a packet 707, a packet 708, a packet 709, and a packet 710 shown in FIG. 7. Details about these packets are not described herein one by one again.

After receiving the packet 710 shown in FIG. 7, R11 queries a local SID table of R11 to determine that 11::11 in the DA field does not correspond to a COC flavor, and corresponds to only a node behavior. Therefore, R11 directly performs the node behavior. For example, R11 first decapsulates the packet 710 to obtain a new packet. The decapsulation is to delete an encapsulated packet header, or to pop out an encapsulated packet header, and the obtained new packet includes the inner packet header (not shown in FIG. 7) and the payload. Then, R11 forwards the new packet based on a DA field in the inner packet header included in the new packet header.

In this way, the packet processing process that is based on the G-SRv6 technology is completed.

The foregoing describes the conventional technology 1. Although the short C-SID is set in the conventional technology 1, and the COC flavor and the two-dimensional pointer are provided for use in cooperation with the C-SID, to reduce a length of the packet header, the conventional technology 1 still has a technical problem. To be specific, when the packet encapsulated with the packet header is obtained based on the conventional technology 1, the packet still needs to include the 128-bit SID (which is in the DA field in the reduce mode, and in the SRH in the non-reduce mode). In addition, the DA field in the conventional technology 1 can be used to carry only one node identifier field and one function field, for example, can carry only one C-SID. Therefore, compression efficiency of the conventional technology 1 is low. The compression efficiency may be understood as efficiency of compressing a C-SID into a packet header. A smaller quantity of C-SIDs carried in a packet header of a same length or a longer length of a packet header carrying a same quantity of C-SIDs indicates lower compression efficiency.

The solution provided in the conventional technology 2 is a uSID technology. The uSID also includes a node identifier field and a function field. For descriptions of the node identifier field and the function field, refer to the foregoing conventional technology 1. Details are not described herein again. In the uSID technology, the head node deletes an address block, an arguments field, and a padding field from each of a plurality of ordered SIDs included in packet transmission path information, to obtain a plurality of ordered uSIDs.

FIG. 8 shows a structure of a packet that is generated by a head node based on the uSID technology and that is encapsulated with a packet header. A DA field of an IPv6 basic packet header includes an address block and at least two uSIDs, and the at least two uSIDs are first at least two uSIDs in a plurality of ordered uSIDs. A uSID other than the at least two uSIDs in the plurality of ordered uSIDs is in a 128-bit container included in a segment list. Therefore, the DA field and each container may each carry the at least two uSIDs. In addition, the DA field and each container each include an address block.

In the uSID technology, each uSID carried in the DA field is first used, and then each uSID carried in each container is used. A use order of different containers is the same as that described above, and a use order of the plurality of containers is still a reverse order of an arrangement order of the plurality of containers. For example, refer to FIG. 8. After the uSID carried in the DA field is used, a container SL [n1] arranged in a last place is first used, and a container SL [0] arranged in a first place is last used. A value of n1 is a total quantity of containers minus 1. In the DA field and each container, a use order of the at least two uSIDs is an arrangement order of the at least two uSIDs. As shown in FIG. 8, in the DA field and each container, a first used uSID is a uSID that is arranged in a high bit and adjacent to the address block, and a last used uSID is a uSID that is arranged in a low bit and that is farthest away from the address block.

In the uSID technology, a left shift operation is further defined, to use with the uSID and a DA update operation that is defined in SRv6. After receiving the packet encapsulated with the packet header, a node other than the head node shifts the uSID included in the DA field to the left according to the left shift operation. Alternatively, the DA field is updated, as a whole, to a next container of the DA field in the segment list according to the DA update operation. In other words, the DA field is updated based on one address block and all uSIDs included in the next container of the DA field.

After receiving the packet encapsulated with the packet header, the node other than the head node may query a locally stored SID table of the node based on the address block included in the DA field and the uSID adjacent to the address block. The SID table records a correspondence between an index entry and a node behavior. The index entry is, for example, an address block, a node identifier field, and a function field. If an index entry recorded in the SID table is hit, a node behavior corresponding to the index entry may be obtained.

Figure 9:
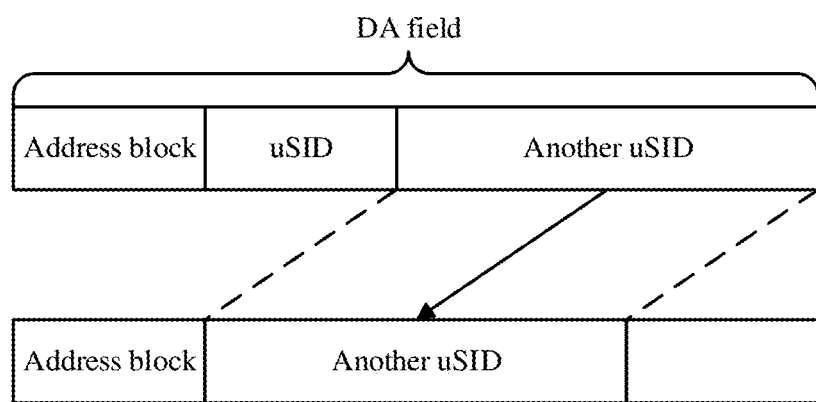
FIG. 9 is a schematic diagram of a left shift operation that is based on a uSID technology according to an embodiment of this application.

If a node needs to perform the left shift operation, the node performs the left shift operation based on the uSID adjacent to the address block. Refer to FIG. 9. For a uSID adjacent to the address block, the left shift operation is: moving, leftward as a whole, another uSID after the uSID adjacent to the address block by a length of the uSID adjacent to the address block. After the left shift operation is performed, the address block is adjacent to the another uSID. This is equivalent to obtaining a new packet encapsulated with the packet header. In this case, after completing the left shift operation, the node may forward, based on the node behavior, the new packet encapsulated with the packet header.

If a node needs to perform the DA update operation, the node determines a next container of the DA field and then updates the DA field to the next container. In the uSID technology, a one-dimensional pointer, namely, the foregoing SL field, is used. A value of the SL field indicates a location of a container in the segment list. In the packet that is generated by the head node and that is encapsulated with the packet header, the value of the SL field is an initial value, and the initial value of the SL field is equal to a total quantity of containers. After receiving the packet encapsulated with the packet header, a node other than the head node updates the value of the SL field, for example, subtracts the value of the SL field by 1, to determine the next container of the DA field. The next container is a container to which an updated value of the SL field points. Then, the node updates the DA field to the next container, that is, updates the DA field based on an address block and all uSIDs in the next container. This is equivalent to obtaining a new packet encapsulated with the packet header. In this case, after completing the DA update operation, the node may forward, based on the node behavior, the new packet encapsulated with the packet header.

Figure 10:
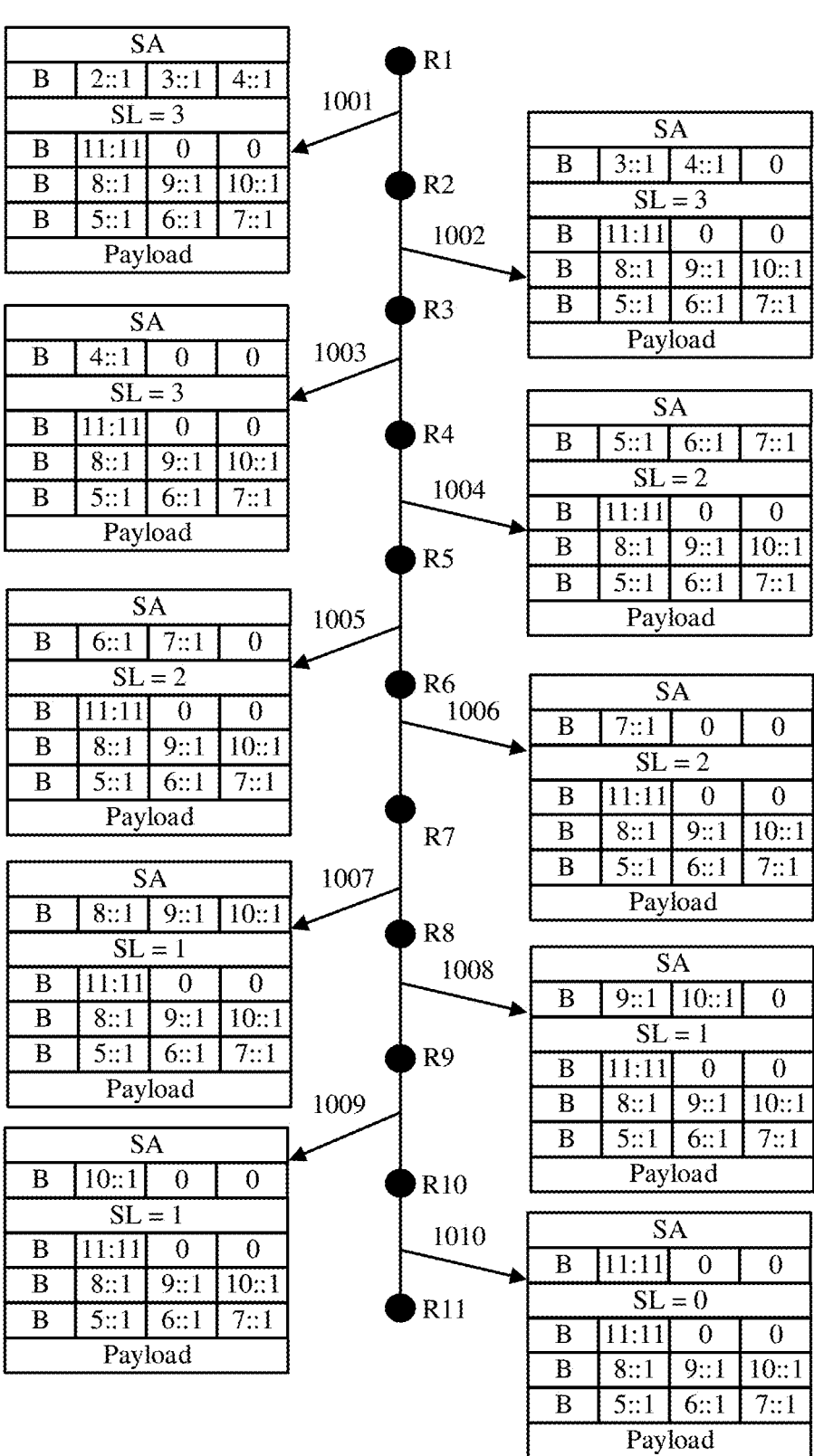
FIG. 10 is a schematic flowchart of a packet processing process that is based on a uSID technology according to an embodiment of this application.

With reference to FIG. 10, the following describes, by using an example, a process of processing a packet based on the uSID technology. In comparison with the packet shown in FIG. 8, in each packet shown in FIG. 10, a part of fields are omitted, and only an SA field and a DA field in an IPv6 basic packet header, an SL field in an SRH, and each container and payload in a segment list are retained. In addition, the DA field and B in each container both represent an address block, to ensure brevity of FIG. 10. FIG. 10 includes 11 nodes R1 to R11, where R1 is a head node. The 1st uSID is 2::1, middle uSIDs are 3::1 to 10::1, and a last uSID is 11:11. Each uSID is 32 bits.

A packet received by R1 includes an inner packet header (not shown in FIG. 10) and a payload. R1 encapsulates a packet header at an outer layer of the packet, to obtain a packet encapsulated with the packet header, that is, a packet 1001 shown in FIG. 10. In the packet 1001, a DA field includes one address block and 2::1 to 4::1, and a segment list in an SRH includes three containers in total, where n1=2. A container [2] includes one address block and 4::1 to 7::1, a container [1] includes one address block and 8::1 to 10::1, and a container [0] includes one address block and 11:11. A padding field is on a right side of 11:11 in the container [0], and the padding field is set to 0. In addition, a value of an SL field in the packet 1001 is an initial value, where SL=3. Then, R1 queries a routing table based on the address block and 2::1 in the DA field, to forward the packet, so that R2 indicated by a node identifier field included in 2::1 receives the packet 1001 shown in FIG. 10.

After receiving the packet 1001, R2 queries a local SID table of R2 based on the address block and 2::1 in the DA field, hits an index entry recorded in the SID table, obtains a node behavior corresponding to the hit index entry, and moves 3::1 and 4::1 leftward, to obtain a packet 1002 shown in FIG. 10. Then, R2 forwards the packet based on the node behavior, so that R3 indicated by a node identifier field included in 3::1 receives the packet 1002.

After receiving the packet 1002, R3 queries a local SID table of R3 based on the address block and 3::1 in the DA field, to obtain a node behavior corresponding to a hit index entry, and moves 4::1 leftward, to obtain a packet 1003 shown in FIG. 10. Then, R3 forwards the packet based on the node behavior, so that R4 indicated by a node identifier field included in 4::1 receives the packet 1003.

After receiving the packet 1003, R4 queries a local SID table of R4 based on the address block and 4::1 in the DA field, to obtain a node behavior corresponding to a hit index entry, and subtracts the value of the SL field by 1, to obtain SL=3−1=2. R4 hits the container [2] based on SL=2, to determine the container [2] as a next container of the DA field. Then, R4 updates, as a whole, the DA field to the address block included in the container [2], and updates 4::1 to 7::1, to obtain a packet 1004 shown in FIG. 10. Then, the packet is forwarded based on the node behavior, so that R5 indicated by a node identifier field included in 5::1 receives the packet 1004.

A principle of performing packet forwarding by R5 to R10 is the same as that described above. Packets that are sent by R5 to R10 and that are encapsulated with packet headers are respectively a packet 1005, a packet 1006, a packet 1007, a packet 1008, a packet 1009, and a packet 1010 shown in FIG. 10. Details about these packets are not described herein one by one again.

After receiving the packet 1010, R11 queries a local SID table of R11 to determine a node behavior corresponding to 11::11 in the DA field. Therefore, R11 directly performs the node behavior. For example, R11 first decapsulates the packet 1010 to obtain a new packet. The decapsulation is to delete an encapsulated packet header, or to pop out an encapsulated packet header, and the obtained new packet includes the inner packet header (not shown in FIG. 10) and the payload. Then, R11 forwards the new packet based on a DA field in the inner packet header included in the new packet header.

In this way, the packet processing process that is based on the uSID technology is completed.

The foregoing describes the conventional technology 2. Although the short uSID is set in the conventional technology 2, and the left shift operation is provided for use in cooperation with the DA update operation and the uSID, to reduce a length of the packet header, the conventional technology 2 still has a technical problem. To be specific, because each container in the segment list carries the address block, and the address block occupies a bit in the container, each container can carry a small quantity of uSIDs, resulting in low compression efficiency of the conventional technology 2. The compression efficiency may be understood as efficiency of compressing a uSID into a packet header. A smaller quantity of uSIDs carried in a packet header of a same length or a longer length of a packet header carrying a same quantity of uSIDs indicates lower compression efficiency.

An embodiment of this application provides a packet processing method, and the method can resolve technical problems in the conventional technology 1 and the conventional technology 2. The method may be applied to a first node, and the first node may be a node other than the destination node in the implementation environment shown in FIG. 1 or FIG. 2. As shown in FIG. 11, the method includes the following step 1101 to step 1104.

Step 1101: A first node receives a first packet, where the first packet includes a DA field and an SRH, the DA field includes at least one C-SID that is sequentially arranged, any C-SID in the at least one C-SID corresponds to one processing flavor indicating a movement operation or a replacement operation, and the at least one C-SID includes a first C-SID corresponding to the first node.

The first packet is a packet encapsulated with a packet header. The packet encapsulated with the packet header includes an outer packet header, an inner packet header, and a payload. The outer packet header is a packet header generated and encapsulated by a head node based on packet transmission path information delivered by a controller. Both the DA field and the SRH that are included in the first packet are in the outer packet header. In an example embodiment, the first packet further includes an IPv6 packet header, and the IPv6 packet header includes the DA field. In other words, the outer packet header includes two packet headers, namely, the IPv6 packet header and the SRH, and the DA field is in the IPv6 packet header. The IPv6 packet header including the DA field is an IPv6 basic packet header, and the SRH is an IPv6 extension packet header.

Figure 12:
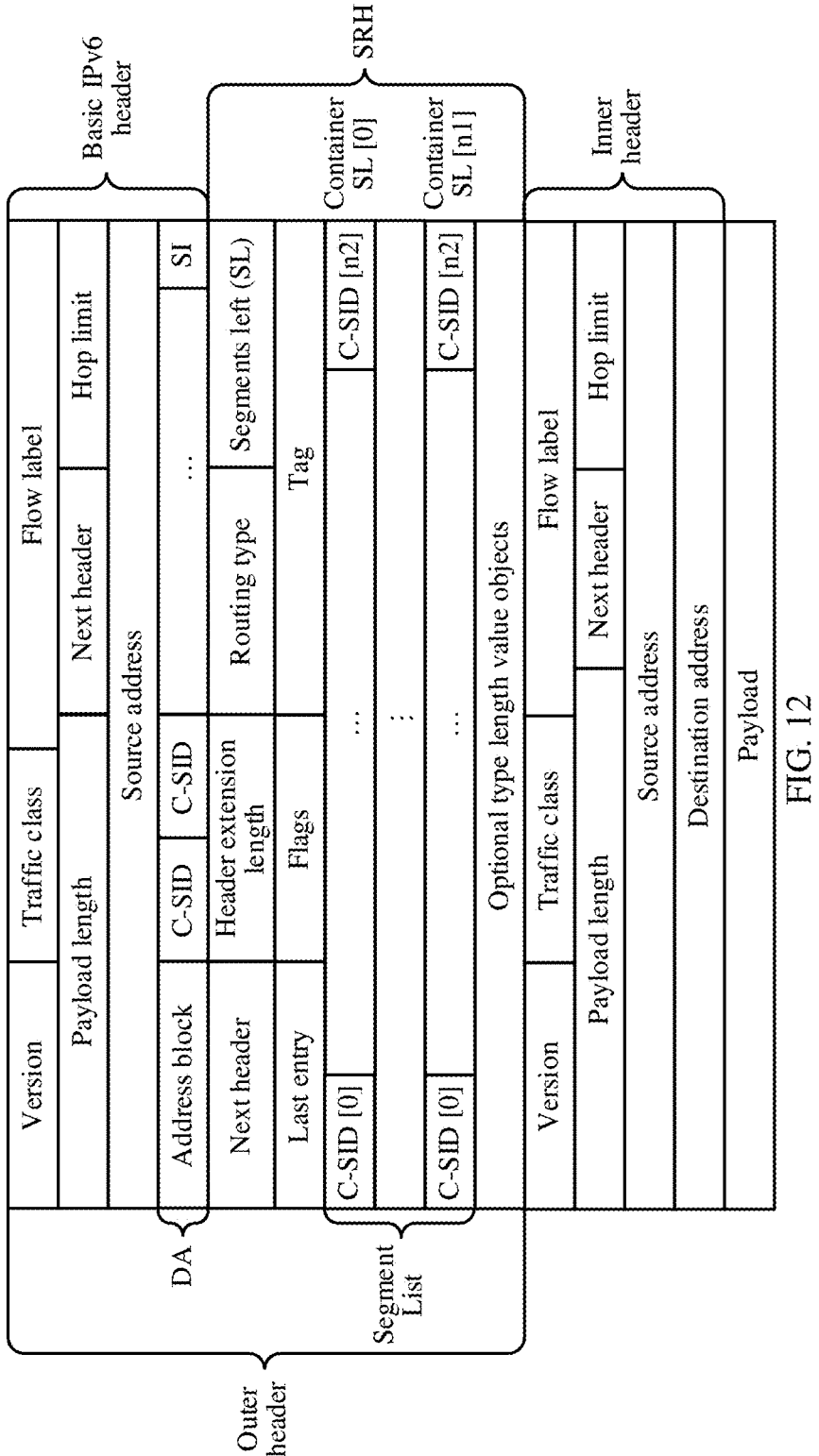
FIG. 12 is a schematic diagram of a structure of a first packet according to an embodiment of this application.

For example, FIG. 12 shows an example structure of the first packet. The DA field includes the at least one C-SID that is sequentially arranged. For example, each C-SID provided in this embodiment of this application may include at least one of a node identifier field and a function field. For example, when a C-SID includes only the node identifier field or includes only the function field, a length of the C-SID is 16 bits. For example, when a C-SID includes both the node identifier field and the function field, a length of the C-SID is 32 bits.

For example, as shown in FIG. 12, in addition to the at least one C-SID that is sequentially arranged, the DA field may further include an address block, and the address block is before the at least one C-SID. For example, a sum of a length of the address block and a length of the at least one C-SID is less than or equal to a length of the DA field. In some implementations, when the sum of the length of the address block and the length of the at least one C-SID is less than the length of the DA field, it indicates that the DA field is not fully filled by the address block and the C-SID, and a bit that is not fully filled may be used as an arguments field and set to 0. In this implementation, all bits represented by ellipses in the DA field shown in FIG. 12 may be 0. Alternatively, one part of the bits may be one or more C-SIDs, and the other part may be 0. In some other implementations, when the sum of the length of the address block and the length of the at least one C-SID is equal to the length of the DA field, it indicates that the DA field is fully filled by the address block and the C-SID. In this implementation, all bits represented by ellipses in the DA field shown in FIG. 12 are one or more C-SIDs.

Still refer to FIG. 12. A segment list of the SRH includes at least one container, in other words, the container is included in the SRH, and a length of each container is 128 bits. In some implementations, when the segment list of the SRH includes only one container, the container is a container for carrying a second C-SID. The container may include only the second C-SID, or may include the second C-SID and another C-SID. For ease of understanding, the second C-SID is described in step 1104 below, and details are not described herein. In some other implementations, when the segment list of the SRH includes at least two containers, one of the containers is a container for carrying the second C-SID, and another container may be a container for carrying another C-SID, or may be a container for carrying a 128-bit SID. When the segment list of the SRH includes the container for carrying the 128-bit SID, it indicates that the SRH further includes at least one SID whose length is 128 bits.

Because nodes in a same SRv6 domain include a same address block, the DA field that carries the at least one C-SID and the container for carrying another C-SID may guide transmission of the first packet in the same SRv6 domain, that is, enable the nodes in the same SRv6 domain to forward the first packet hop by hop based on the C-SIDs. In addition to guiding the transmission of the first packet in the same SRv6 domain, the container for carrying the 128-bit SID may further guide transmission of the first packet outside the SRv6 domain. For example, outside the SRv6 domain may be between two different SRv6 domains. In this case, a C-SID and a SID may be used together to guide transmission of the first packet in a cross-SRv6 domain scenario, so that the first packet can be transmitted in different SRv6 domains based on a specified packet transmission path. Therefore, the SRH further includes at least one SID whose length is 128 bits, so that flexibility of transmitting the first packet can be improved.

In the at least one sequentially arranged C-SID included in the DA field, any C-SID, that is, any C-SID, may correspond to one processing flavor indicating a movement operation or a replacement operation.

In some implementations, the processing flavor is a flavor corresponding to a node behavior. Because the processing flavor indicates a movement operation (next) or a replacement operation (COC), the processing flavor in this implementation may be a NEXT & COC flavor. In other words, the C-SID corresponds to both the node behavior and the NEXT & COC flavor.

In this implementation, the node behavior indicates a packet forwarding manner, for example, forwarding a packet by querying a routing table, or forwarding a packet by using a link corresponding to a specified interface. The NEXT & COC flavor indicates a movement operation or a replacement operation. In addition, in this implementation, the C-SID is not a new type of C-SID because the node behavior is the same as a node behavior corresponding to an existing type of C-SID. For example, forwarding a packet by querying a routing table is a node behavior corresponding to an existing C-SID of an End SID type. Forwarding a packet by using a link corresponding to a specified interface is a node behavior corresponding to an existing C-SID of an End.X SID type.

Alternatively, in some other implementations, the processing flavor is a node behavior, and the C-SID corresponds to the node behavior. The node behavior indicates a packet forwarding manner, and also indicates a movement operation or a replacement operation. Because the node behavior is different from a node behavior corresponding to an existing type of C-SID, in this implementation, the C-SID belongs to a new type of C-SID.

The at least one C-SID includes the first C-SID corresponding to the first node. For ease of representing the processing flavor corresponding to the first C-SID, the processing flavor corresponding to the first C-SID is referred to as a first processing flavor below. Because the DA field includes the at least one C-SID, after receiving the first packet, the first node needs to determine a C-SID that is in the at least one C-SID and that is a C-SID that the first node needs to use, namely, the first C-SID, and further needs to determine whether the first C-SID corresponds to the first processing flavor indicating a movement operation or a replacement operation. Therefore, in an example embodiment, the first node stores an SID table, and the SID table records a correspondence between a C-SID and a processing flavor. The method further includes: The first node queries the SID table based on the at least one C-SID. In response to that any C-SID in the at least one C-SID hits a C-SID recorded in the SID table, the first node determines that the any C-SID is the first C-SID, and determines that a processing flavor corresponding to the hit C-SID is the first processing flavor.

The C-SID recorded in the SID table locally stored in the first node is the first C-SID corresponding to the first node. The SID table further records the processing flavor corresponding to the first C-SID, namely, the first processing flavor. Therefore, if any C-SID in the at least one C-SID in the DA field hits the C-SID recorded in the SID table, it may indicate that the any C-SID is the first C-SID. Therefore, the first node may determine the any C-SID as the first C-SID, and the first node may use the processing flavor corresponding to the hit C-SID as the first processing flavor.

For example, the SID table records a C-SID in a form of an index entry, and the index entry includes a combination of an address block and a C-SID. Correspondingly, after receiving the first packet, the first node queries the SID table of the first node based on the address block included in the DA field and a specified C-SID in the at least one C-SID included in the DA field. If an index entry recorded in the SID table is hit, it indicates that the specified C-SID is the first C-SID corresponding to the first node. In addition, when the processing flavor is a flavor corresponding to a node behavior, the SID table records a correspondence between an index entry, the node behavior, and the flavor. Alternatively, when the processing flavor is a node behavior, the SID table records a correspondence between an index entry and the node behavior. Therefore, after the index entry recorded in the SID table is hit, the first node may use, as the first processing flavor, the processing flavor corresponding to the index entry.

In some implementations, the specified C-SID is a C-SID that is in the DA field and that is adjacent to the address block. A use order of the at least one C-SID in the DA field is an arrangement order, in other words, a C-SID closer to the address block is used first, and a C-SID farther away from the address block is used later. For example, the first node may lock the address block and the specified C-SID in a longest mask matching manner. The longest mask matching manner is that, the SID table is first queried by using 128 bits of all DA fields, and if no index entry is hit, the SID table is continuously reduced based on 128 bits until the SID table includes an address block and a C-SID adjacent to the address block, so that an index entry can be hit based on the address block and the C-SID adjacent to the address block, and then the C-SID adjacent to the address block is used as the first C-SID corresponding to the first node.

In some other implementations, the specified C-SID is a C-SID that is in the DA field and that is farthest away from the address block. In this case, a use order of the at least one C-SID in the DA field is a reverse order of an arrangement order, in other words, a C-SID that is farther away from the address block is used first, and a C-SID that is closer to the address block is used later. In this implementation, the first node may first determine a C-SID that is farthest away from the address block, and then query the SID table of the first node based on the address block and the determined C-SID, to hit an index entry in the SID table, so that the C-SID that is farthest away from the address block can be used as the first C-SID.

In some implementations, the first C-SID includes the node identifier field, a C-SID following the first C-SID includes the function field, and the C-SID following the first C-SID corresponds to the first node. That the first C-SID includes the node identifier field may be that the first C-SID includes only the node identifier field, or may be that the first C-SID includes the node identifier field and the function field. Because both the first C-SID and the C-SID following the first C-SID are C-SIDs corresponding to the first node, the first node first uses the first C-SID, and then executes the next C-SID. When the first processing flavor is a flavor corresponding to a node behavior, the first node first executes a node behavior and the first processing flavor that correspond to the first C-SID, and then executes a node behavior and a processing flavor that correspond to the next C-SID. Alternatively, when the first processing flavor is a node behavior, the first node first executes the first processing flavor corresponding to the first C-SID, and then executes a processing flavor corresponding to the next C-SID.

For example, both the next C-SID and the first C-SID may be in the DA field, or may be in the SRH. A location of the next C-SID is not limited herein.

In some other implementations, the first C-SID includes a function field, and a C-SID following the first C-SID corresponds to a downstream node of the first node in a forwarding path of the first packet. The forwarding path is the packet transmission path in the foregoing descriptions. That the first C-SID includes the function field may be that the first C-SID includes only the function field. Alternatively, that the first C-SID includes the function field may be that the first C-SID includes the function field and the node identifier field, in other words, the first C-SID further includes the node identifier field in addition to the function field. Regardless of a field included in the first C-SID, when the first processing flavor is a flavor corresponding to a node behavior, the first node executes the node behavior and the first processing flavor that correspond to the first C-SID. Alternatively, when the first processing flavor is a node behavior, the first node executes the first processing flavor corresponding to the first C-SID.

For example, a length of the first C-SID may be 16 bits or 32 bits. For example, when the first C-SID includes only the node identifier field, or the first C-SID includes only the function field, the length of the first C-SID is 16 bits. For another example, when the first C-SID includes both the node identifier field and the function field, the length of the first C-SID is 32 bits.

For example, when the first node receives the first packet through a strict path, the first C-SID may include only the function field. The strict path means that a previous node of the first node can determine that a next node is the first node. Therefore, the previous node of the first node only needs to directly send the first packet to the first node, and the first packet does not need to be routed to the first node based on the node identifier field indicating the first C-SID. Therefore, the first C-SID may not include the node identifier field, and includes only the function field. For example, when the first node receives the first packet based on loose path, the first C-SID cannot include only the function field, but needs to include the node identifier field. The loose path means that a previous node of the first node cannot determine that a next node is the first node. As a result, the previous node of the first node needs to route the first packet to the first node based on the node identifier field indicating the first C-SID. Therefore, the first C-SID needs to carry the node identifier field.

Step 1102: The first node determines, depending on whether another C-SID is further included after the first C-SID, whether the first processing flavor corresponding to the first C-SID indicates a movement operation or a replacement operation.

In step 1101, the first node determines the first C-SID by querying the local SID table, and has determined the first processing flavor corresponding to the first C-SID, where the first processing flavor indicates a movement operation or a replacement operation. Therefore, the first node needs to further determine, depending on whether the another C-SID is further included after the first C-SID, whether the first processing flavor indicates a movement operation or a replacement operation. A length of the another C-SID is not limited in this embodiment of this application. A length of the another C-SID may be 16 bits, 32 bits, or another length less than 128 bits. When the length of the first C-SID is different from the length of the another C-SID, hybrid compression of C-SIDs of different lengths is implemented in the first packet.

In an example embodiment, that the first node determines, depending on whether another C-SID is further included after the first C-SID, whether a first processing flavor corresponding to the first C-SID indicates a movement operation or a replacement operation includes: The first node determines, based on that another C-SID is included after the first C-SID, that the first processing flavor indicates a movement operation, where in this case, the first node may continue to perform step 1103; or the first node determines, based on that no another C-SID is included after the first C-SID, that the first processing flavor indicates a replacement operation, where in this case, the first node may continue to perform step 1104.

For example, the first node may determine, by determining whether a bit of a specified length after the first C-SID is 0, whether the another C-SID is included after the first C-SID. If the bit of the specified length is 0, it indicates that no another C-SID is included after the first C-SID. If the bit of the specified length is not 0, it indicates that no another C-SID is included after the first C-SID. The specified length is not limited in this embodiment of this application. For example, the specified length may be the same as the length of the first C-SID. For example, if the first C-SID is 16 bits, the specified length is also 16 bits. If the first C-SID is 32 bits, the specified length is also 32 bits. For another example, the specified length may be another fixed length that is set based on experience or an actual requirement, for example, fixed 32 bits or 64 bits.

Step 1103: When the first processing flavor indicates a movement operation, the first node moves a target field, to enable the target field to cover the first C-SID in the DA field, where the target field is a field that is after the first C-SID and that is in the DA field.

In some implementations, the first C-SID is a C-SID that is in the DA field and that is adjacent to the address block. Refer to FIG. 13 and FIG. 14. When moving the target field, the first node may move the target field leftward by the length of the first C-SID, so that the target field covers the first C-SID.

For example, refer to FIG. 13. A length of the target field is a difference between the length of the DA field and a target length, and the target length is a sum of the length of the address block and the length of the first C-SID. The target field may include only a C-SID, or may include a C-SID and a zeroed bit. For example, after the first node moves the target field, the method further includes: The first node sets a field that is after the moved target field and that is in the DA field to 0. FIG. 13 shows the field that is after the moved target field and that is in the DA field.

Alternatively, refer to FIG. 14. A length of the target field is a difference between the length of the DA field and a target length, and the target length is a sum of the length of the address block, the length of the first C-SID, and a length of a zeroed bit in the DA field. The target field includes only a C-SID but does not include the zeroed bit. For example, after the first node moves the target field, the method further includes: The first node sets a field that is after the moved target field and that is in the DA field to 0. It can be learned from FIG. 14 that the field that is after the moved target field and that is in the DA field is a field between the moved target field and the zeroed bit.

Figure 15:
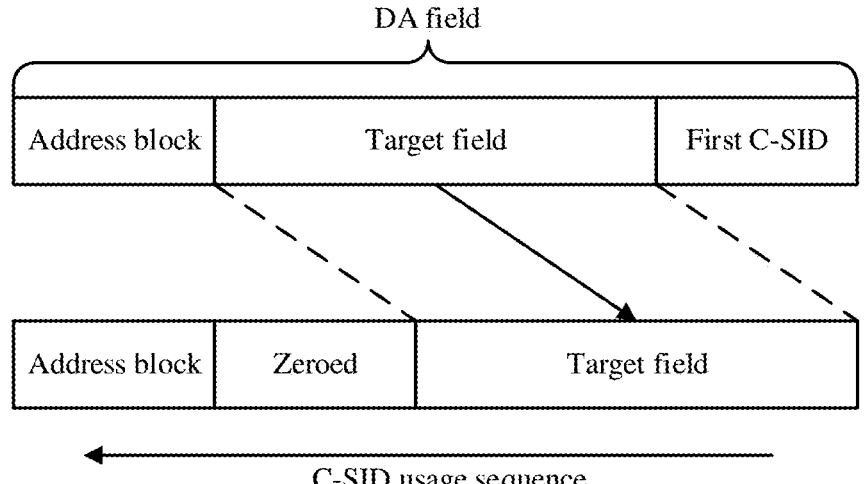
FIG. 15 is still another schematic diagram of moving a target field according to an embodiment of this application.

In some other implementations, the first C-SID is a C-SID that is in the DA field and that is farthest away from the address block. Refer to FIG. 15. When moving the target field, the first node may move the target field rightwards by the length of the first C-SID, so that the target field covers the first C-SID. For example, after the first node moves the target field, the method further includes: The first node sets a field that is after the moved target field and that is in the DA field to 0. It can be learned from FIG. 15 that the field that is after the moved target field and that is in the DA field is a field between the address block and the moved target field.

Step 1104: When the first processing flavor indicates a replacement operation, the first node replaces the first C-SID in the DA field with a second C-SID, where the second C-SID is a C-SID in the SRH.

The first node needs to first determine the second C-SID in the SRH, and then replace the first C-SID in the DA field with the second C-SID. For example, the first packet further includes a first pointer and a second pointer. The first pointer is an SI field, and the second pointer is an SL field. FIG. 12 shows a case in which the SI field is in the DA field and the SL field is located in the SRH field. In addition to the case shown in FIG. 12, the SI field may alternatively be in a flags field, a tag field, or the like in the SRH. A location of the SI field in the first packet is not limited herein. Correspondingly, the first node may determine the second C-SID in the following two implementations based on the first pointer and the second pointer.

In some implementations, before the first node replaces the first C-SID in the DA field with the second C-SID, the method further includes: The first node updates a value of the first pointer and a value of the second pointer, to enable the value of the first pointer to indicate a location of the second C-SID in a container in which the second C-SID is located, and enable the value of the second pointer to indicate a location that is in the SRH and that is of the container in which the second C-SID is located; and the first node determines the second C-SID based on the value of the first pointer and the value of the second pointer.

The first node may update the value of the first pointer and the value of the second pointer when the value of the first pointer is 0, that is, when the value of the SI field is 0. For example, the updating a value of the first pointer includes: determining that the value of the first pointer is N−1, where N is a maximum quantity of C-SIDs in the container. The updating a value of the second pointer includes: subtracting the value of the second pointer by 1, that is, subtracting the value of the SL field by 1.

A reason thereof is that when the value of the SI field is 0, it indicates that a last C-SID in a current container (a container to which the value of the second pointer points when the value of the second pointer is not updated) is used, and the second C-SID that should be used subsequently is the 1st C-SID in a next container. Therefore, the first node needs to subtract the value of the SL by 1, so that an updated value of the SL field points to the next container, that is, the value of the SL field indicates the location that is in the SRH and that is of the container in which the second C-SID is located. In addition, the first node further needs to determine the value of the SI as N−1, so that an updated value of the SI points to the first C-SID, that is, the value of the SI field indicates the location of the second C-SID in the container in which the second C-SID is located. In this way, the first node may determine the second C-SID based on the updated value of the first pointer and the updated value of the second pointer. The foregoing process of determining the value of the first pointer as N−1 is also referred to as initializing the value of the SI field.

In some other implementations, before the first node replaces the first C-SID in the DA field with the second C-SID, the method further includes: The first node updates a value of the first pointer, to enable the value of the first pointer to indicate a location of the second C-SID in a container in which the second C-SID is located; and the first node determines the second C-SID based on the value of the first pointer and a value of the second pointer, where the value of the second pointer indicates a location that is in the SRH and that is of the container in which the second C-SID is located.

When the value of the first pointer is not 0 and the value of the second pointer is not 0, that is, when neither the value of the SI field nor the value of the SL field is 0, the first node may update only the value of the first pointer, but does not update the value of the second pointer. For example, the updating a value of the first pointer includes: subtracting the value of the first pointer by 1.

A reason thereof is that when neither the value of the SI field nor the value of the SL field is 0, it indicates that an unused C-SID still exists in a current container (a container to which the value of the second pointer points when the value of the second pointer is not updated), and the second C-SID that should be used subsequently is a next C-SID in the current container. Therefore, the first node does not need to update the value of the SL field, and the value that is not updated and that is of the SL field may indicate the location that is in the SRH and that is of the container in which the second C-SID is located. The first node needs to subtract the value of the SI field by 1, so that an updated value of the SI field points to the next C-SID, that is, the value of the SI field indicates the location of the second C-SID in the container in which the second C-SID is located. Therefore, the first node may determine the second C-SID based on the updated value of the first pointer and the value that is not updated and that is of the second pointer.

After determining the second C-SID, the first node can replace the first C-SID in the DA field with the second C-SID, in other words, the first node replaces the first C-SID in the DA field with the second C-SID, so that the DA field includes the address block and the second C-SID.

It can be learned from step 1102 that, in this embodiment of this application, the replacement operation is performed when the another C-SID is not included after the first C-SID. For example, in this case, the DA field includes the address block, the first C-SID, and some bits that have been set to 0. In a process of performing the replacement operation, if a length of the second C-SID is equal to the length of the first C-SID, the replacement is directly performed.

Alternatively, if a length of the second C-SID is less than the length of the first C-SID, after the first C-SID is replaced with the second C-SID, the first node further needs to set a bit that can be covered by the first C-SID but cannot be covered by the second C-SID to 0. For example, the DA field sequentially includes a 32-bit address block (bits 0 to 31), a 32-bit first C-SID (bits 32 to 63), and 64 bits (bits 64 to 127) that are set to 0. If the length of the second C-SID is 16 bits, bits 48 to 63 in the DA field are bits that can be covered by the first C-SID but cannot be covered by the second C-SID, and these bits need to be set to 0.

Alternatively, if a length of the second C-SID is greater than the length of the first C-SID, in addition to covering the first C-SID, the second C-SID further covers some bits that have been set to 0. For example, the DA field sequentially includes a 32-bit address block (bits 0 to 31), a 16-bit first C-SID (bits 32 to 47), and 80 bits (bits 48 to 127) that are set to 0. If the length of the second C-SID is 32 bits, the second C-SID further covers bits 48 to 63 in the DA field in addition to the bits covered by the first C-SID. Therefore, bits that have been set to 0 are reduced from bits 48 to 127 bits to bits 64 to 127.

After the first node performs step 1103 or step 1104, in an example embodiment, the method further includes: The first node sends a packet obtained by performing the movement operation or the replacement operation. In comparison with the first packet received by the first node, because the first node performs the movement operation or the replacement operation on the first packet, the new packet may be obtained, and a DA field of the new packet is different from the DA field of the first packet. In addition, it can be learned based on the descriptions in step 1101 that the first node can obtain a packet forwarding manner by querying the SID table. Therefore, the first node may send, in the packet forwarding manner based on the DA field, the new packet obtained by performing the movement operation or the replacement operation.

For example, in the foregoing step 1101 to step 1104, an example in which the first packet includes the DA field and the SRH field is used for description. For example, the first packet may alternatively include only the DA field, and the DA field is in an IPv6 basic packet header. In this case, for a structure of the first packet, refer to FIG. 16. The DA field of the first packet includes the at least one C-SID that is sequentially arranged, and each C-SID, except a last C-SID, in the at least one C-SID may correspond to one processing flavor indicating a movement operation or a replacement operation. In addition, the at least one C-SID includes the first C-SID corresponding to the first node.

In other words, in this embodiment of this application, when there are a large quantity of C-SIDs, in other words, there are a large quantity of label stack layers, the large quantity of C-SIDs may be separately compressed into the DA field and the SRH field based on the structure shown in FIG. 12. In this embodiment of this application, when a quantity of C-SIDs is small, in other words, when a quantity of label stack layers is small, the small quantity of C-SIDs may be compressed into the DA field based on the structure shown in FIG. 16, so that the SRH field may not be required.

Figure 16:
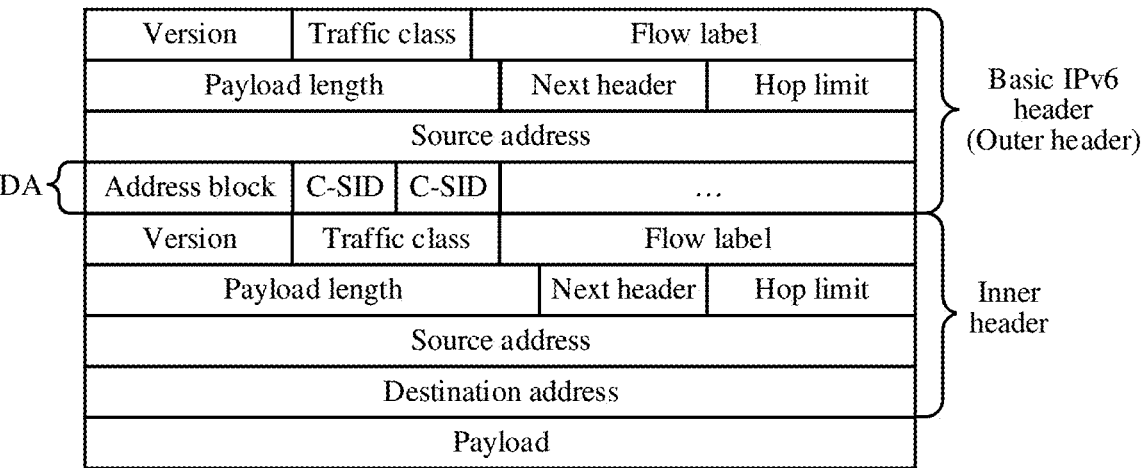
FIG. 16 is a schematic diagram of a structure of another first packet according to an embodiment of this application.

After receiving a packet shown in FIG. 16, the first node also needs to first determine, based on the descriptions in step 1101, the first C-SID and the first processing flavor corresponding to the first C-SID, and then determine, based on the descriptions in step 1102, whether the first processing flavor indicates a movement operation or a replacement operation. The first node determines, through determining, that the first processing flavor indicates a movement operation, but does not determine that the first processing flavor indicates a replacement operation. Therefore, the first node performs the movement operation only based on the descriptions in step 1103. Details about the movement operation are not described herein again.

The foregoing describes, with reference to FIG. 11 to FIG. 16, the packet processing method that is provided in embodiments of this application and that is applied to the first node. For example, the method may be represented as the following pseudocode.

if NEXT&COC==TRUE: //a first processing flavor cor-
responding to a first C-SID is NEXT&COC flavor
if DA[Block+NF . . . Block+2NF–1]!=0 //if a bit of a
specified length after the first C-SID is not 0, in other
words, another C-SID after the first C-SID is further
included in a DA field
DA[Block . . . 127-NF]=DA[Block+NF . . . 127] //a target
field that is after the first C-SID and that is in the DA
field is moved left by a length of the first C-SID, to
enable the target field to cover the first C-SID
DA[127-NF . . . 127]=0 //set a field that is after the moved
target field and that is in the DA field to 0
forward
else: //if a bit of a specified length after the first C-SID is
0, in other words, another C-SID after the first C-SID
is not included in a DA field
if SI>0: //if a value of an SI field is greater than 0
SI--; //subtract 1 from the value of the SI field, and a value
of an SL field does not need to be updated
DA[Block . . . Block+NF–1]=SRH[SL][SI] //replace the
first C-SID with a second C-SID to which the value of
the SI field and the value of the SL field point, where
the second C-SID is in an SRH
else://if a value of an SI field is 0
if SL>0: //if a value of an SL field is greater than 0
SL--; //subtract 1 from the value of the SL field
SI=128/NF–1 //initialize the value of the SI field, in
other words, update the value of the SI field to a
maximum quantity (that is, 128/NF) of C-SIDs in a
container minus 1
DA[Block . . . Block+NF–1]=SRH[SL][SI] //replace
the first C-SID with a second C-SID to which the
value of the SI field and the value of the SL field
point, where the second C-SID is in an SRH
else: //if a value of an SL field is 0
upper layer processing //perform upper layer pro-
cessing
forward In comparison with the conventional technology 1, in this embodiment of this application, the first packet does not need to carry the 128-bit SID, and the DA field may carry the at least one C-SID. Therefore, according to the method provided in this embodiment of this application, C-SID compression efficiency is improved, and the length of the first packet is reduced, so that fewer transmission resources are occupied, and processing efficiency of the first packet is improved.

In comparison with the conventional technology 2, in this embodiment of this application, in a same SRv6 domain, that is, in a SRv6 domain in which the first node is located, the first packet needs to carry only one address block corresponding to the first C-SID in the DA field, and each container included in the SRH does not need to carry the address block corresponding to the first C-SID. However, in different SRv6 domains, a container included in the SRH may carry an address block corresponding to another SRv6 domain, and the another SRv6 domain is an SRv6 domain other than the SRv6 domain in which the first node is located. For example, the another SRv6 domain corresponds to one or more containers, and one of the one or more containers may carry the address block corresponding to the another SRv6. It can be learned that, regardless of whether the SRH is in the same SRv6 domain, the SRH may not include the address block corresponding to the first C-SID. Therefore, each container can carry more C-SIDs. In this way, C-SID compression efficiency is improved, and the length of the first packet is reduced, so that fewer transmission resources are occupied, and processing efficiency of the first packet is improved. In addition, in this embodiment of this application, when it is determined that a replacement operation needs to be performed, the first C-SID in the DA field is replaced with the second C-SID in the SRH, and the entire 128-bit DA field does not need to be replaced with an entire 128-bit container. Therefore, the replacement operation provided in this embodiment of this application is flexible, and efficiency is high.

In conclusion, the packet processing method that is provided in this embodiment of this application and that is applied to the first node can flexibly process a packet. In addition, because C-SID compression efficiency of the processed first packet is high, packet processing efficiency of processing the first packet by the first node is also high.

An embodiment of this application further provides another packet processing method. The method may be applied to a second node, and the second node may be the head node in the implementation environment shown in FIG. 1 or FIG. 2. As shown in FIG. 17, the method includes the following step 1701 to step 1703.

Step 1701: A second node receives a second packet.

The second node may receive the second packet from a terminal device, and the second packet may include the inner packet header and the payload shown in FIG. 12 or FIG. 16.

Step 1702: The second node obtains a first packet based on the second packet, where the first packet includes a DA field and an SRH, the DA field includes at least one C-SID that is sequentially arranged, any C-SID in the at least one C-SID corresponds to one processing flavor indicating a movement operation or a replacement operation, and the at least one C-SID includes a first C-SID corresponding to a first node.

The second node may generate a packet header based on packet transmission path information delivered by a controller, and encapsulate the packet header into an outer layer of the second packet, to obtain the first packet shown in FIG. 12 or FIG. 16.

In an example embodiment, the first packet further includes a first pointer, namely, an SI field. Before the second node sends the first packet to the first node, the method further includes: The second node sets a value of the first pointer to 0, where the value of the first pointer is for updating the first node, to enable the value of the first pointer to indicate a location of the second C-SID in a container in which the second C-SID is located.

For example, when the SI field is in another field that is other than the DA field and that is in the SRH, for example, a flags field or a tag field, the second node reserves a location for the SI field, and sets the SI field to an initial value, that is, sets a value of the SI field to 0. Alternatively, when the SI field is in the DA field, for example, when the SI field is located in last two bits of an arguments field in the DA field, the second node may not reserve a location for the SI field, and does not set the SI field to an initial value. In this way, the DA field can be fully filled by the address block and a plurality of C-SIDs, and a quantity of C-SIDs that can be carried in the DA field is increased.

In an example embodiment, the first packet further includes a second pointer, namely, an SL field. Before the second node sends the first packet to the first node, the method further includes: The second node sets a value of the second pointer to an initial value, where the initial value is a quantity of containers included in the SRH, and the value of the second pointer is for updating the first node, to enable the value of the second pointer to indicate a location that is in the SRH and that is of the container in which the second C-SID is located.

Step 1703: The second node sends the first packet to the first node.

The second node may send the first packet to the first node based on a loose path or a strict path. For the loose path and the strict path, refer to the descriptions in step 1101. Details are not described herein again.

In conclusion, the packet processing method that is provided in this embodiment of this application and that is applied to the second node can improve C-SID compression efficiency, so that the first node flexibly processes a packet, and packet processing efficiency is improved.

Figure 18:
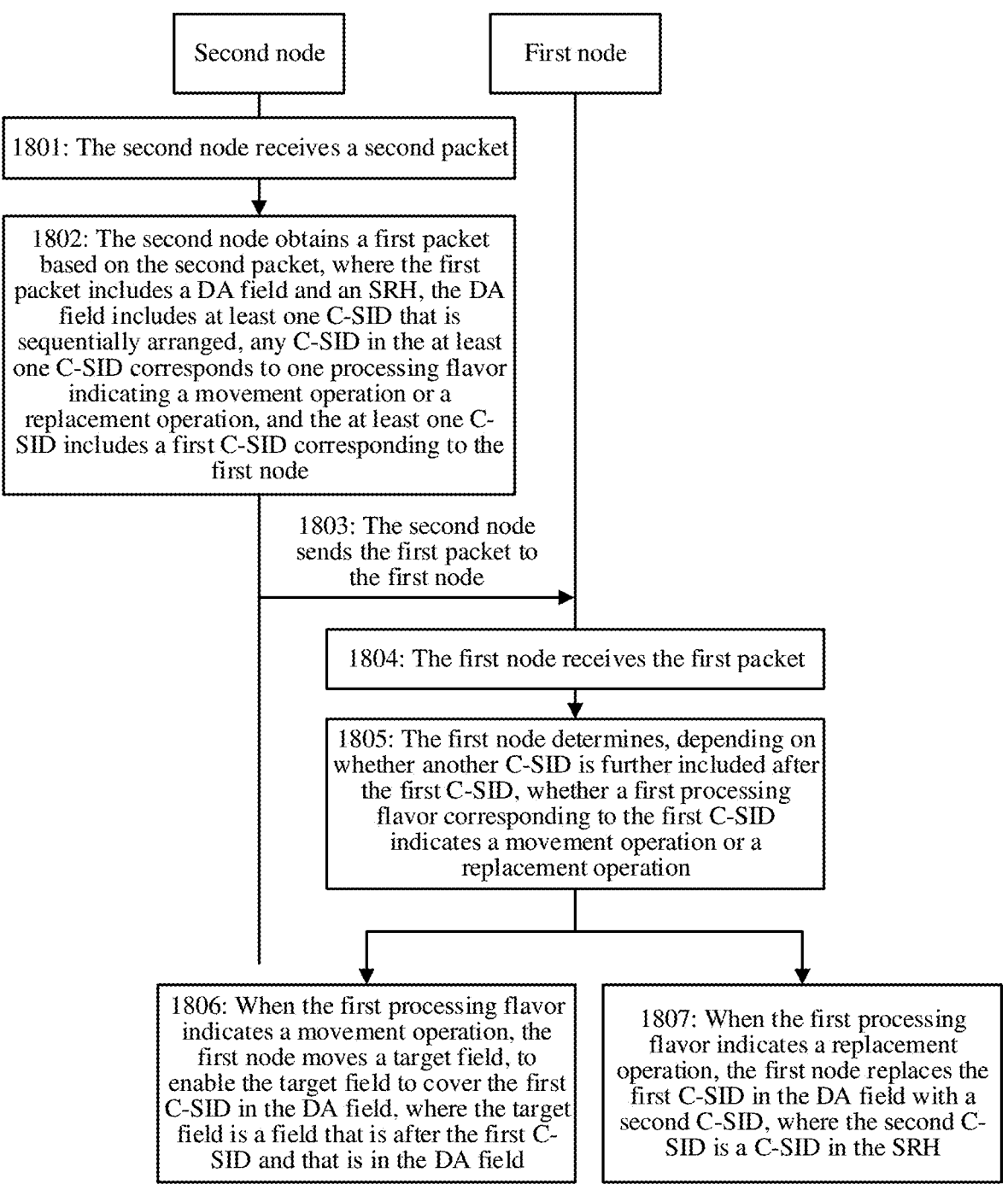
FIG. 18 is a flowchart of still another packet processing method according to an embodiment of this application.

In addition, an embodiment of this application further provides a packet processing method. The method may be implemented through interaction between the first node and the second node. As shown in FIG. 18, the method includes step 1801 to step 1807.

Step 1801: A second node receives a second packet. For step 1801, refer to the descriptions in step 1701.

Step 1802: The second node obtains a first packet based on the second packet, where the first packet includes a destination address DA field and a segment routing header SRH, the DA field includes at least one compressed segment identifier C-SID that is sequentially arranged, any C-SID in the at least one C-SID corresponds to one processing flavor indicating a movement operation or a replacement operation, and the at least one C-SID includes a first C-SID corresponding to a first node. For step 1802, refer to the descriptions in step 1101 and step 1702.

Step 1803: The second node sends the first packet to the first node. For step 1803, refer to the descriptions in step 1703.

Step 1804: The first node receives the first packet. For step 1804, refer to the descriptions in step 1101.

Step 1805: The first node determines, depending on whether another C-SID is further included after the first C-SID, whether a first processing flavor corresponding to the first C-SID indicates a movement operation or a replacement operation. For step 1804, refer to the descriptions in step 1102.

Step 1806: When the first processing flavor indicates a movement operation, the first node moves a target field, to enable the target field to cover the first C-SID in the DA field, where the target field is a field that is after the first C-SID and that is in the DA field. For step 1806, refer to the descriptions in step 1103.

Step 1807: When the first processing flavor indicates a replacement operation, the first node replaces the first C-SID in the DA field with a second C-SID, where the second C-SID is a C-SID in the SRH. For step 1806, refer to the descriptions in step 1104.

In addition, for a technical effect of the packet processing method shown in FIG. 18, refer to the technical effects of the packet processing methods shown in FIG. 11 and FIG. 17. Details are not described herein again.

The foregoing separately describes the packet processing method applied to the first node, the packet processing method applied to the second node, and the packet processing method applied to the interaction between the first node and the second node. Next, the methods provided in embodiments of this application are described by using two different application scenarios as an example.

Figure 19:
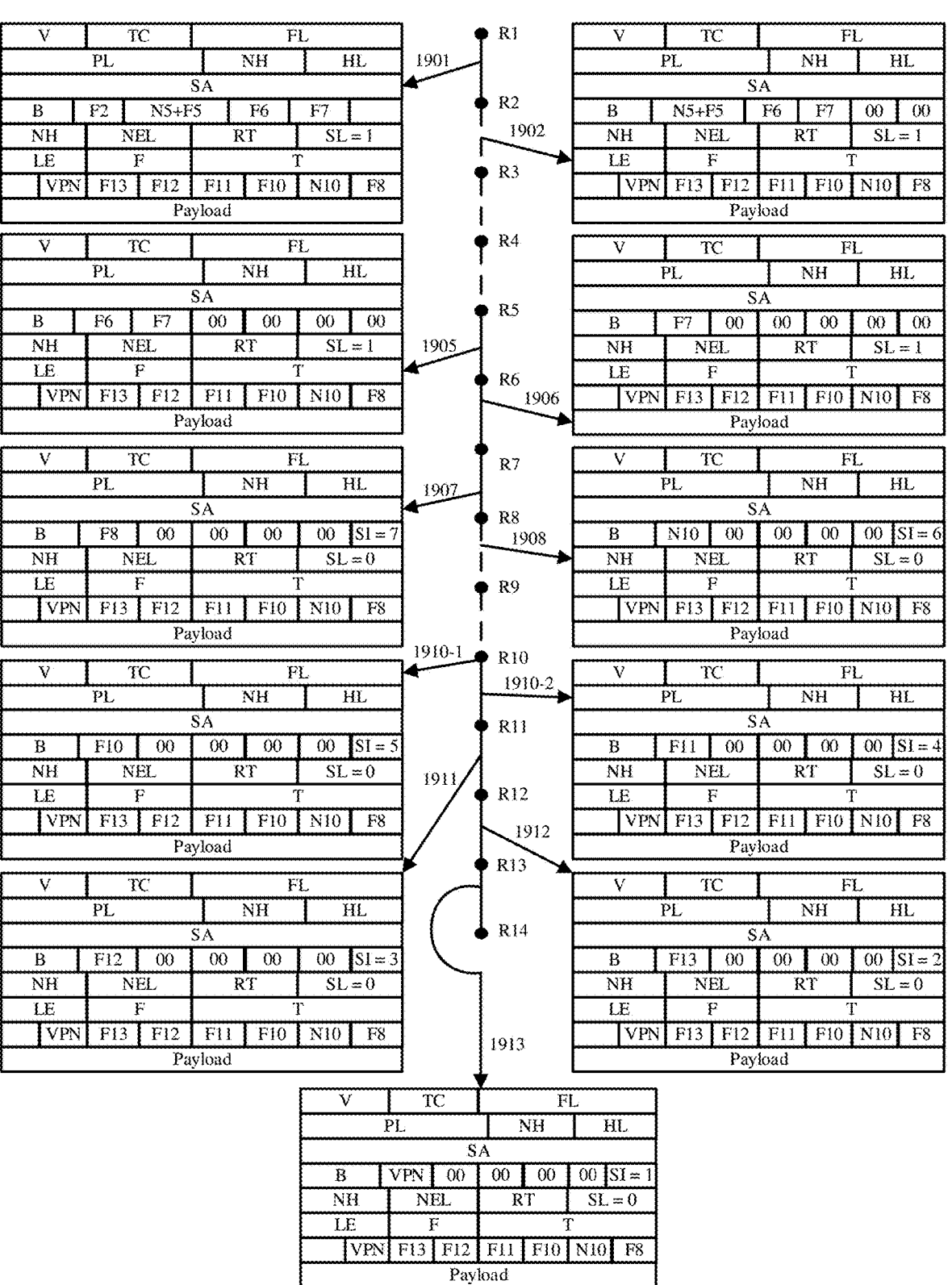
FIG. 19 is a schematic flowchart of a packet processing process according to an embodiment of this application.

Scenario 1: Refer to FIG. 19. The scenario 1 is a scenario in which hybrid compression is performed on a 16-bit C-SID and a 32-bit C-SID, and a packet in the scenario 1 includes a DA field and an SRH. In comparison with the packet shown in FIG. 12, some fields are omitted in each packet shown in FIG. 19, to ensure brevity of FIG. 19.

FIG. 19 includes nodes R1 to R14. R1 is a head node, a loose path is between R2 and R5, a loose path is between R8 and R10, and a strict path is between other nodes. F2 to F13 represent C-SIDs corresponding to a NEXT & COC flavor. A VPN represents a C-SID that does not correspond to a NEXT & COC flavor. A single F represents a C-SID that includes only a node identifier field. A single N represents a C-SID that includes only a function field. N+F represents a C-SID that includes both a node identifier field and a function field. Based on this, N5+F5 is a 32-bit C-SID, and other C-SIDs are all 16-bit C-SIDs.

A packet received by R1 includes an inner packet header (not shown in FIG. 19) and a payload. R1 generates and encapsulates a packet header, to obtain a packet 1901 shown in FIG. 19. In the packet 1901, SL=1, and there is no SI field. Then, R1 sends the packet 1901 to R2 through the strict path based on an address block and F2.

R2 receives the packet 1901 through the strict path, queries a local SID table of R2 based on the address block and F2, determines that F2 corresponds to an NEXT & COC flavor, and obtains a node behavior corresponding to F2. Because another C-SID is further included after F2, that is, three C-SIDs N5+F5 to F7, R2 determines that the NEXT & COC flavor indicates a movement operation. In this case, R2 moves N5+F5 to F7 in the DA field leftward by 16 bits, and sets a field after F7 in the DA field to 0, to obtain a packet 1902 shown in FIG. 19, where SL=1 and SI=0 in the packet 1902. Then, R2 forwards the packet 1902 through the loose path based on the address block and N5+F5 and based on the node behavior corresponding to F2.

R3 receives the packet 1902 through the loose path, and queries a local SID table of R3 based on the address block and N5+F5, but fails to hit. Therefore, R3 queries a routing table based on the address block and N5+F5, and forwards the packet 1902 through the loose path.

R4 receives the packet 1902 through the loose path, and queries a local SID table of R4 based on the address block and N5+F5, but fails to hit. Therefore, R4 queries the routing table based on the address block and N5+F5, and forwards the packet 1902 through the loose path.

R5 receives the packet 1902 through the loose path, queries a local SID table of R5 based on the address block and N5+F5, determines that N5+F5 corresponds to a NEXT & COC flavor, and obtains a node behavior corresponding to N5+F5. Because another C-SID is further included after N5+F5, that is, two C-SIDs F6 and F7, R5 determines that the NEXT & COC flavor indicates a movement operation. Therefore, R5 moves F6 and F7 in the DA field leftward by 32 bits, and sets a field after F7 in the DA field to 0, to obtain a packet 1905 shown in FIG. 19, where SL=1 and SI=0 in the packet 1905. Then, R5 sends the packet 1905 to R6 through the strict path based on the address block and F6 and based on the node behavior corresponding to N5+F5.

R6 receives the packet 1905 through the strict path, queries a local SID table of R6 based on the address block and F6, determines that F6 corresponds to an NEXT & COC flavor, and obtains a node behavior corresponding to F6. In addition, because another C-SID is further included after F6, that is, the C-SID F7, R6 determines that the NEXT & COC flavor indicates a movement operation. Therefore, R6 moves F7 in the DA field leftward by 16 bits, and sets a field after F7 in the DA field to 0, to obtain a packet 1906 shown in FIG. 19, where SL=1 and SI=0 in the packet 1906. Then, R6 sends the packet 1906 to R7 through the strict path based on the address block and F7 and based on the node behavior corresponding to F6.

R7 receives the packet 1906 through the strict path, queries a local SID table of R7 based on the address block and F7, determines that F7 corresponds to an NEXT & COC flavor, and obtains a node behavior corresponding to F7. In addition, because no another C-SID is included after F7, R7 determines that the NEXT & COC flavor indicates a replacement operation. Because SI=0, and a maximum quantity of C-SIDs in a container is 8, R7 updates a value of an SI field and a value of an SL field, to obtain initialized SI=7 and SL=1–0. Because SL=0 and SI=7 point to F8 in the SRH, R7 replaces F7 in the DA field with F8, to obtain a packet 1907 shown in FIG. 19, where SL=0 and SI=7 in the packet 1907. R7 sends the packet 1907 to R8 through the strict path based on the address block and F8 and based on the node behavior corresponding to F7.

R8 receives the packet 1907 through the strict path, queries a local SID table of R8 based on the address block and F8, determines that F8 corresponds to an NEXT & COC flavor, and obtains a node behavior corresponding to F8. In addition, because no another C-SID is included after F8, R8 determines that the NEXT & COC flavor indicates a replacement operation. Because SI=7>0, R8 calculates SI=7–1=6, and SL=0 remains unchanged. Because SL=0 and SI=6 point to N10 in the SRH, R8 replaces F8 in the DA field with N10, to obtain a packet 1908 shown in FIG. 19, where SL=0 and SI=6 in the packet 1908. Then, R8 forwards the packet 1908 through the loose path based on the address block and N10 and based on the node behavior corresponding to F8.

R9 receives the packet 1908 through the loose path, and queries a local SID table of R9 based on the address block and N10, but fails to hit. Therefore, R9 queries the routing table based on the address block and N10 and forwards the packet 1908 through the loose path.

R10 receives the packet 1908 through the loose path, queries a local SID table of R10 based on the address block and N10, determines that N10 corresponds to a NEXT & COC flavor, and obtains a node behavior corresponding to N10. In addition, because no another C-SID is included after N10, R10 determines that the NEXT & COC flavor indicates a replacement operation. Because SI=6>0, R10 calculates SI=6–1=5, and SL=0 remains unchanged. Because SL=0 and SI=5 point to F10 in the SRH, R10 replaces N10 in the DA field with F10, to obtain a packet 1910-1 shown in FIG. 19, where SL=0 and SI=6 in the packet 1910-1. Then, R10 continues to query the local SID table of R10 based on the address block and F10 and based on the node behavior corresponding to N10.

R10 queries the local SID table of R10 based on the address block and F10, determines that F10 corresponds to an NEXT & COC flavor, and obtains a node behavior corresponding to F10. In addition, because no another C-SID is included after F10, R10 determines that the NEXT & COC flavor indicates a replacement operation. Because SI=5>0, R10 calculates SI=5–1=4, and SL=0 remains unchanged. Because SL=0 and SI=4 point to F11 in the SRH, R10 replaces F10 in the DA field with F11, to obtain a packet 1910-2 shown in FIG. 19, where SL=0, and SI=4 in the packet 1910-2. Then, R10 sends the packet 1910-2 to R11 through the strict path based on the address block and F11 and based on the node behavior corresponding to F10.

R11 receives the packet 1910-2 through the strict path, queries a local SID table of R11 based on the address block and F11, determines that F11 corresponds to a NEXT & COC flavor, and obtains a node behavior corresponding to F11. In addition, because no another C-SID is included after F11, R11 determines that the NEXT & COC flavor indicates a replacement operation. Because SI=4>0, R11 calculates SI=4–1=3, and SL=0 remains unchanged. Because SL=0 and SI=3 point to F12 in the SRH, R11 replaces F11 in the DA field with F12, to obtain a packet 1911 shown in FIG. 19, where SL=0, and SI=3 in the packet 1911. Then, R11 sends the packet 1911 to R12 through the strict path based on the address block and F12 and based on the node behavior corresponding to F11.

R12 receives the packet 1911 through the strict path, queries a local SID table of R12 based on the address block and F12, determines that F12 corresponds to an NEXT & COC flavor, and obtains a node behavior corresponding to F12. In addition, because no another C-SID is included after F12, R12 determines that the NEXT & COC flavor indicates a replacement operation. Because SI=3>0, R12 calculates SI=3–1=2, and SL=0 remains unchanged. Because SL=0 and SI=2 point to F13 in the SRH, R12 replaces F12 in the DA field with F13, to obtain a packet 1912 shown in FIG. 19, where SL=0, and SI=2 in the packet 1912. Then, R12 sends the packet 1912 to R13 through the strict path based on the address block and F13 and based on the node behavior corresponding to F12.

R13 receives the packet 1912 through the strict path, queries a local SID table of R13 based on the address block and F13, determines that F13 corresponds to an NEXT & COC flavor, and obtains a node behavior corresponding to F13. In addition, because no another C-SID is included after F13, it is determined that the NEXT & COC flavor indicates a replacement operation. Because SI=2>0, R12 calculates SI=2–1=1, and SL=0 remains unchanged. Because SL=0 and SI=1 point to the VPN in the SRH, R13 replaces F13 in the DA field with the VPN, to obtain a packet 1913 shown in FIG. 19, where SL=0, and SI=1 in the packet 1913. Then, R13 sends the packet 1913 to R14 through the strict path based on the address block and the VPN and based on the node behavior corresponding to F13.

R14 R receives the packet 1913 through the strict path, and queries a local SID table of R14 based on the address block and the C-SID VPN, to obtain a node behavior corresponding to the C-SID VPN. The node behavior is, for example, performing decapsulation and packet forwarding by using a specified VPN instance. In addition, the C-SID VPN does not correspond to a NEXT & COC flavor. Therefore, R14 decapsulates the packet 1913, removes or pops out the encapsulated packet header, to obtain the inner packet header (not shown in FIG. 19) and the payload, and then forwards the inner packet header and the payload based on the VPN instance specified in the node behavior, so that a terminal device indicated by the DA field included in the inner packet header can obtain the inner packet header and the payload.

In this way, a packet processing process in the scenario 1 is completed.

Figure 20:
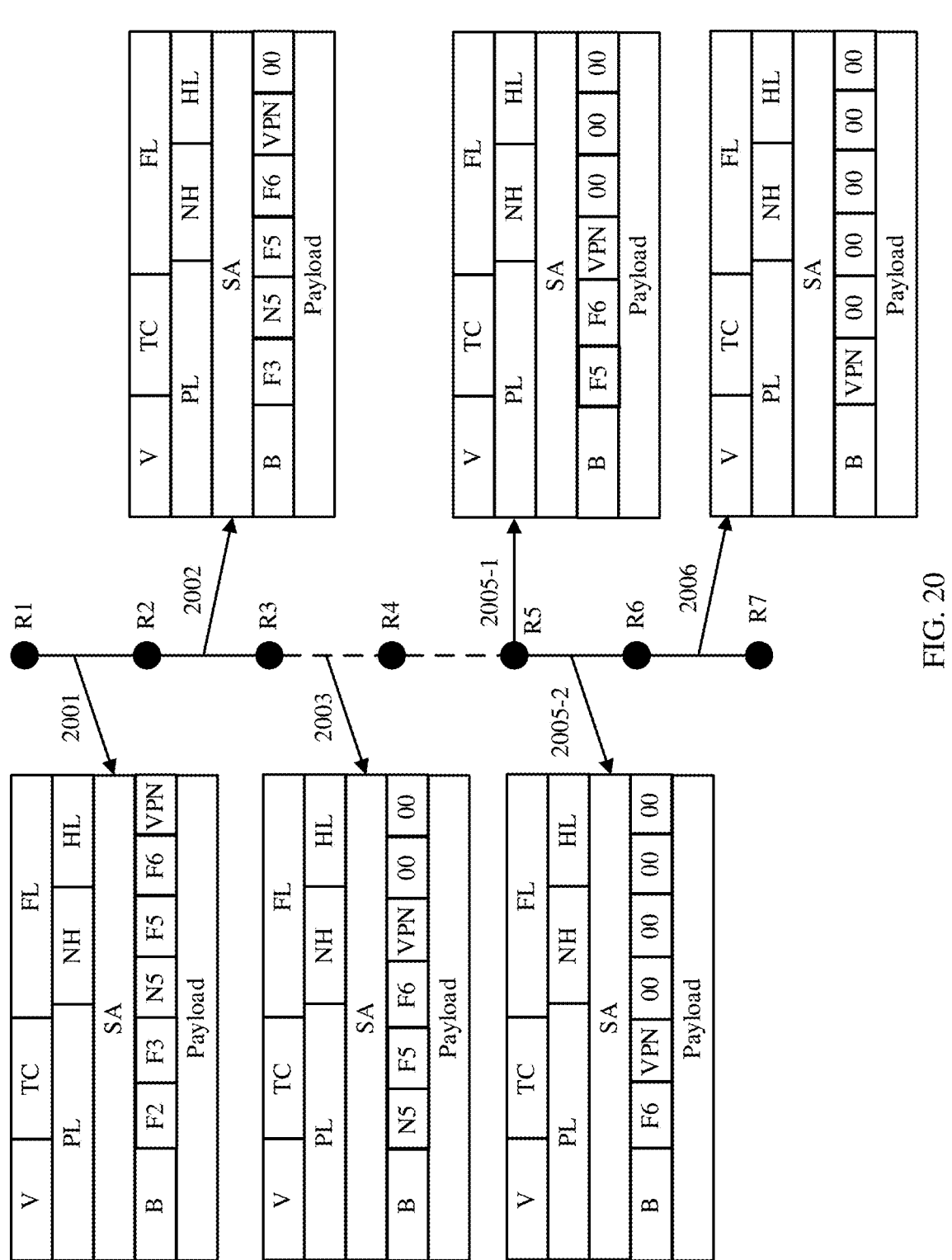
FIG. 20 is a schematic flowchart of another packet processing process according to an embodiment of this application.

Scenario 2: Refer to FIG. 20. The scenario 2 is a scenario in which a pure 16-bit C-SID is compressed, and a packet in the scenario 2 includes only a DA field but does not include an SRH. In comparison with the packet shown in FIG. 16, some fields are omitted in each packet shown in FIG. 20, to ensure brevity of FIG. 20.

FIG. 20 includes nodes R1 to R7. R1 is a head node, a loose path is between R3 and R5, and a strict path is between other nodes. F2 to F6 represent C-SIDs corresponding to a NEXT & COC flavor. A VPN represents a C-SID that does not correspond to a NEXT & COC flavor. A single F represents a C-SID that includes only a node identifier field.

A single N represents a C-SID that includes only a function field. Each C-SID shown in FIG. 20 is a 16-bit C-SID.

A packet received by R1 includes an inner packet header (not shown in FIG. 20) and a payload. R1 generates and encapsulates a packet header, to obtain a packet 2001 shown in FIG. 20. Then, R1 sends the packet 2001 to R2 through the strict path based on an address block and F2.

R2 receives the packet 2001 through the strict path, queries a local SID table of R2 based on the address block and F2, determines that F2 corresponds to an NEXT & COC flavor, and obtains a node behavior corresponding to F2. Because another C-SID is further included after F2, that is, five C-SIDs F3 to VPN, R2 determines that the NEXT & COC flavor indicates a movement operation. In this case, R2 moves F3 to VPN in the DA field leftward by 16 bits, and sets a field after the C-SID VPN in the DA field to 0, to obtain a packet 2002 shown in FIG. 20. Then, R2 sends the packet 2002 to R3 through the strict path based on the address block and F3 and based on the node behavior corresponding to F2.

R3 receives the packet 2002 through the strict path, queries a local SID table of R3 based on the address block and F3, determines that F3 corresponds to an NEXT & COC flavor, and obtains a node behavior corresponding to F3. Because another C-SID is further included after F3, that is, four C-SIDs N5 to VPN, R3 determines that the NEXT & COC flavor indicates a movement operation. In this case, R3 moves N5 to VPN in the DA field leftward by 16 bits, and sets a field after the C-SID VPN in the DA field to 0, to obtain a packet 2003 shown in FIG. 20. Then, R3 sends the packet 2003 through the loose path based on the address block and N5 and based on the node behavior corresponding to F3.

R4 receives the packet 2003 through the loose path, and queries a local SID table of R4 based on the address block and N5, but fails to hit. Therefore, R4 queries a routing table based on the address block and N5 and forwards the packet 2003 through the loose path.

R5 receives the packet 2003 through the loose path, queries a local SID table of R5 based on the address block and N5, determines that N5 corresponds to a NEXT & COC flavor, and obtains a node behavior corresponding to N5. Because another C-SID is further included after N5, that is, three C-SIDs F5 to VPN, R5 determines that the NEXT & COC flavor indicates a movement operation. In this case, R5 moves F5 to VPN in the DA field leftward by 16 bits, and sets a field after the C-SID VPN in the DA field to 0, to obtain a packet 2005-1 shown in FIG. 20. Then, R5 continues to query the local SID table of R5 based on the address block and F5 and based on the node behavior corresponding to N5.

R5 queries the local SID table of R5 based on the address block and F5, determines that F5 corresponds to an NEXT & COC flavor, and obtains a node behavior corresponding to F5. Because another C-SID is further included after F5, that is, two C-SIDs F6 and VPN, R5 determines that the NEXT & COC flavor indicates a movement operation. In this case, R5 moves F6 and VPN in the DA field leftward by 16 bits, and sets a field after the C-SID VPN in the DA field to 0, to obtain a packet 2005-2 shown in FIG. 20. R5 sends the packet 2005-2 to R6 through the strict path based on the address block and F6 and based on the node behavior corresponding to F5.

R6 receives the packet 2005-2 through the strict path, queries a local SID table of R6 based on the address block and F6, determines that F6 corresponds to a NEXT & COC flavor, and obtains a node behavior corresponding to F6.

Because another C-SID is further included after F6, that is, the C-SID VPN, R6 determines that the NEXT & COC flavor indicates a movement operation. In this case, R6 moves the VPN in the DA field leftward by 16 bits, and sets a field after the C-SID VPN in the DA field to 0, to obtain a packet 2006 shown in FIG. 20. Then, R6 sends the packet 2006 to R7 through the strict path based on the address block and the VPN and based on the node behavior corresponding to F6.

R7 receives the packet 2006 through the strict path, and queries a local SID table of R7 based on the address block and the C-SID VPN, to obtain a node behavior corresponding to the C-SID VPN. The node behavior is, for example, performing decapsulation and packet forwarding by using a specified VPN instance. In addition, the C-SID VPN does not correspond to a NEXT & COC flavor. Therefore, R7 decapsulates the packet 2006, removes or pops out the encapsulated packet header, to obtain the inner packet header (not shown in FIG. 20) and the payload, and then forwards the inner packet header and the payload based on the VPN instance specified in the node behavior, so that a terminal device indicated by the DA field included in the inner packet header can obtain the inner packet header and the payload.

Therefore, a packet processing process in the scenario 2 is completed.

Figure 21:
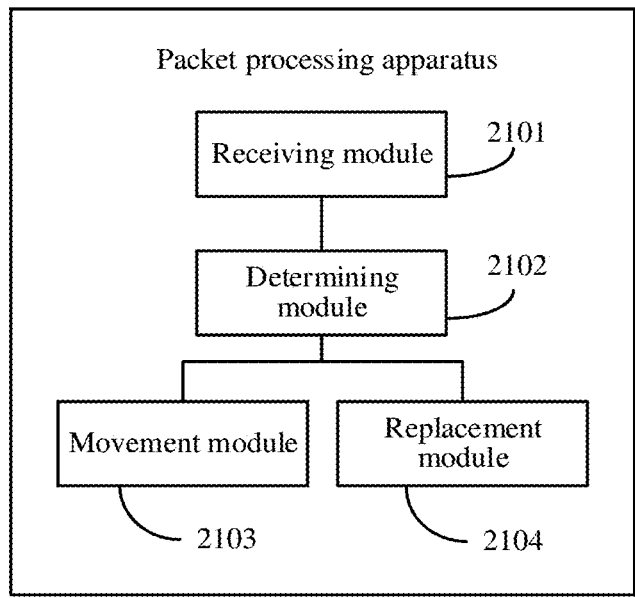
FIG. 21 is a schematic diagram of a structure of a packet processing apparatus according to an embodiment of this application.

Corresponding to the foregoing described packet processing methods, an embodiment of this application further provides a packet processing apparatus. The apparatus is used in a first node. The apparatus is configured to perform, by using modules shown in FIG. 21, the packet processing methods performed by the first node in FIG. 11 and FIG. 18. As shown in FIG. 21, the packet processing apparatus provided in this embodiment of this application includes the following modules.

A receiving module 2101 is configured to receive a first packet, where the first packet includes a DA field and an SRH, the DA field includes at least one C-SID that is sequentially arranged, any C-SID in the at least one C-SID corresponds to one processing feature indicating a movement operation or a replacement operation, and the at least one C-SID includes a first C-SID corresponding to the first node.

A determining module 2102 is configured to determine, depending on whether another C-SID is further included after the first C-SID, whether a first processing feature corresponding to the first C-SID indicates a movement operation or a replacement operation.

A movement module 2103 is configured to: when the first processing flavor indicates a movement operation, move a target field, to enable the target field to cover the first C-SID in the DA field, where the target field is a field that is after the first C-SID and that is in the DA field.

A replacement module 2104 is configured to: when the first processing flavor indicates a replacement operation, replace the first C-SID in the DA field with a second C-SID, where the second C-SID is a C-SID in the SRH.

In an example embodiment, the determining module 2102 is configured to: determine, based on that another C-SID is included after the first C-SID, that the first processing flavor indicates a movement operation; or determine, based on that no another C-SID is included after the first C-SID, that the first processing flavor indicates a replacement operation.

In an example embodiment, the first packet further includes a first pointer and a second pointer. The replacement module 2104 is further configured to update a value of the first pointer and a value of the second pointer, to enable the value of the first pointer to indicate a location of the second C-SID in a container in which the second C-SID is located, and enable the value of the second pointer to indicate a location that is in the SRH and that is of the container in which the second C-SID is located; and determine the second C-SID based on the value of the first pointer and the value of the second pointer.

In an example embodiment, the first packet further includes a first pointer and a second pointer. The replacement module 2104 is configured to update a value of the first pointer, to enable the value of the first pointer to indicate a location of the second C-SID in a container in which the second C-SID is located; and determine the second C-SID based on the value of the first pointer and a value of the second pointer, where the value of the second pointer indicates a location that is in the SRH and that is of the container in which the second C-SID is located.

In an example embodiment, the replacement module 2104 is configured to determine that the value of the first pointer is N−1, where N is a maximum quantity of C-SIDs accommodated in the container; or subtract 1 from the value of the first pointer.

In an example embodiment, the container is included in the SRH, and a length of the container is 128 bits.

In an example embodiment, the movement module 2103 is further configured to set a field that is after the moved target field and that is in the DA field to 0.

In an example embodiment, the first node stores an SID table, and the SID table records a correspondence between a C-SID and a processing flavor. The determining module 2102 is further configured to query the SID table based on the at least one C-SID; and in response to that any C-SID in the at least one C-SID hits a C-SID recorded in the SID table, determine that the any C-SID is the first C-SID, and determine that a processing flavor corresponding to the hit C-SID is the first processing flavor.

In an example embodiment, the apparatus further includes a sending module, configured to send a packet obtained by performing the movement operation or the replacement operation.

In an example embodiment, the processing flavor is a flavor corresponding to a node behavior, or the processing flavor is a node behavior.

In an example embodiment, the first C-SID includes a node identifier field, a C-SID following the first C-SID includes a function field, and the C-SID following the first C-SID corresponds to the first node.

In an example embodiment, the first C-SID includes a function field, and a C-SID following the first C-SID corresponds to a downstream node of the first node in a forwarding path of the first packet.

In an example embodiment, the first C-SID further includes the node identifier field. In an example embodiment, a length of the first C-SID is 16 bits or 32 bits.

In an example embodiment, the DA field further includes an address block, and the address block is before the at least one C-SID.

In an example embodiment, a sum of a length of the address block and a length of the at least one C-SID is less than or equal to a length of the DA field.

In an example embodiment, a length of the target field is a difference between the length of the DA field and a target length, and the target length is a sum of the length of the address block and the length of the first C-SID. Alternatively, the target length is a sum of the length of the address block, the length of the first C-SID, and a length of a zeroed bit in the DA field.

In an example embodiment, the first packet further includes an IPv6 packet header, and the IPv6 packet header includes the DA field.

In an example embodiment, the SRH further includes at least one SID whose length is 128 bits.

In an example embodiment, the SRH does not include an address block corresponding to the first C-SID.

Figure 22:
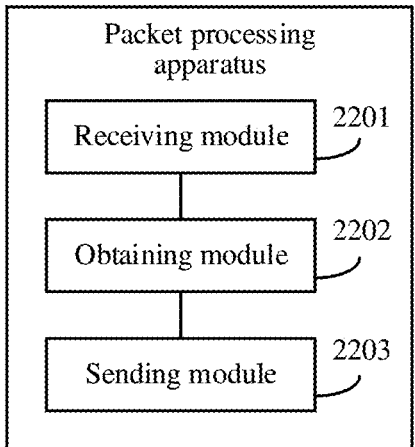
FIG. 22 is a schematic diagram of a structure of another packet processing apparatus according to an embodiment of this application.

Corresponding to the foregoing described packet processing methods, an embodiment of this application further provides a packet processing apparatus. The apparatus is used in a second node. The apparatus is configured to perform, by using modules shown in FIG. 22, the packet processing methods performed by the second node in FIG. 17 and FIG. 18. As shown in FIG. 22, the packet processing apparatus provided in this embodiment of this application includes the following modules.

A receiving module 2201 is configured to receive a second packet.

An obtaining module 2202 is configured to obtain a first packet based on the second packet, where the first packet includes a destination address DA field and a segment routing header SRH, the DA field includes at least one compressed segment identifier C-SID that is sequentially arranged, any C-SID in the at least one C-SID corresponds to one processing flavor indicating a movement operation or a replacement operation, and the at least one C-SID includes a first C-SID corresponding to a first node.

A sending module 2203 is configured to send the first packet to the first node.

A first processing flavor corresponding to the first C-SID is used by the first node to determine, depending on whether another C-SID is further included after the first C-SID, whether the first processing flavor indicates a movement operation or a replacement operation. When the first processing flavor indicates a movement operation, the first processing flavor is used by the first node to move a target field, to enable the target field to cover the first C-SID in the DA field. The target field is a field that is after the first C-SID and that is in the DA field. When the first processing flavor indicates a replacement operation, the first processing flavor is used by the first node to replace the first C-SID in the DA field with a second C-SID. The second C-SID is a C-SID in the SRH.

In an example embodiment, the processing flavor is a flavor corresponding to a node behavior, or the processing flavor is a node behavior.

In an example embodiment, the first packet further includes a first pointer. The sending module 2203 is further configured to set a value of the first pointer to zero, where the value of the first pointer is for updating the first node, to enable the value of the first pointer to indicate a location of the second C-SID in a container in which the second C-SID is located.

In an example embodiment, the first packet further includes a second pointer. The sending module 2203 is further configured to set a value of the second pointer to an initial value, where the initial value is a quantity of containers included in the SRH, and the value of the second pointer is for updating the first node, to enable the value of the second pointer to indicate a location that is in the SRH and that is of the container in which the second C-SID is located.

In an example embodiment, the container is included in the SRH, and a length of the container is 128 bits.

In an example embodiment, the first C-SID includes a node identifier field, a C-SID following the first C-SID includes a function field, and the C-SID following the first C-SID corresponds to the first node.

In an example embodiment, the first C-SID includes a function field, and a C-SID following the first C-SID corresponds to a downstream node of the first node in a forwarding path of the first packet.

In an example embodiment, the first C-SID further includes the node identifier field. In an example embodiment, a length of the first C-SID is 16 bits or 32 bits.

In an example embodiment, the DA field further includes an address block, and the address block is before the at least one C-SID.

In an example embodiment, a sum of a length of the address block and a length of the at least one C-SID is less than or equal to a length of the DA field.

In an example embodiment, a length of the target field is a difference between the length of the DA field and a target length, and the target length is a sum of the length of the address block and the length of the first C-SID. Alternatively, the target length is a sum of the length of the address block, the length of the first C-SID, and a length of a zeroed bit in the DA field.

In an example embodiment, the first packet further includes an internet protocol version 6 IPv6 packet header, and the IPv6 packet header includes the DA field.

In an example embodiment, the SRH further includes at least one SID whose length is 128 bits.

In an example embodiment, the SRH does not include an address block corresponding to the second C-SID.

For technical effects of the packet processing apparatuses provided in FIG. 21 and FIG. 22, refer to the technical effects of the packet processing methods shown in FIG. 11, FIG. 17, and FIG. 18. Details are not described herein again.

It should be understood that, when the apparatuses provided in FIG. 21 and FIG. 22 implement functions of the apparatuses, division into the foregoing functional modules is merely used as an example for description. In actual application, the foregoing functions may be allocated to different functional modules for implementation based on a requirement. That is, an inner structure of a device is divided into different functional modules, to implement all or some of the functions described above. In addition, the apparatuses provided in the foregoing embodiments and the method embodiments belong to a same concept. For specific implementation processes thereof, refer to the method embodiments. Details are not described herein again.

In an example embodiment, an embodiment of this application further provides a packet processing device. The device includes a memory and a processor. The memory stores at least one instruction, and the at least one instruction is loaded and executed by the processor, to enable the device to implement the packet processing method shown in FIG. 11, or implement the packet processing method shown in FIG. 17. The packet processing device may be the first node or the second node.

Figure 23:
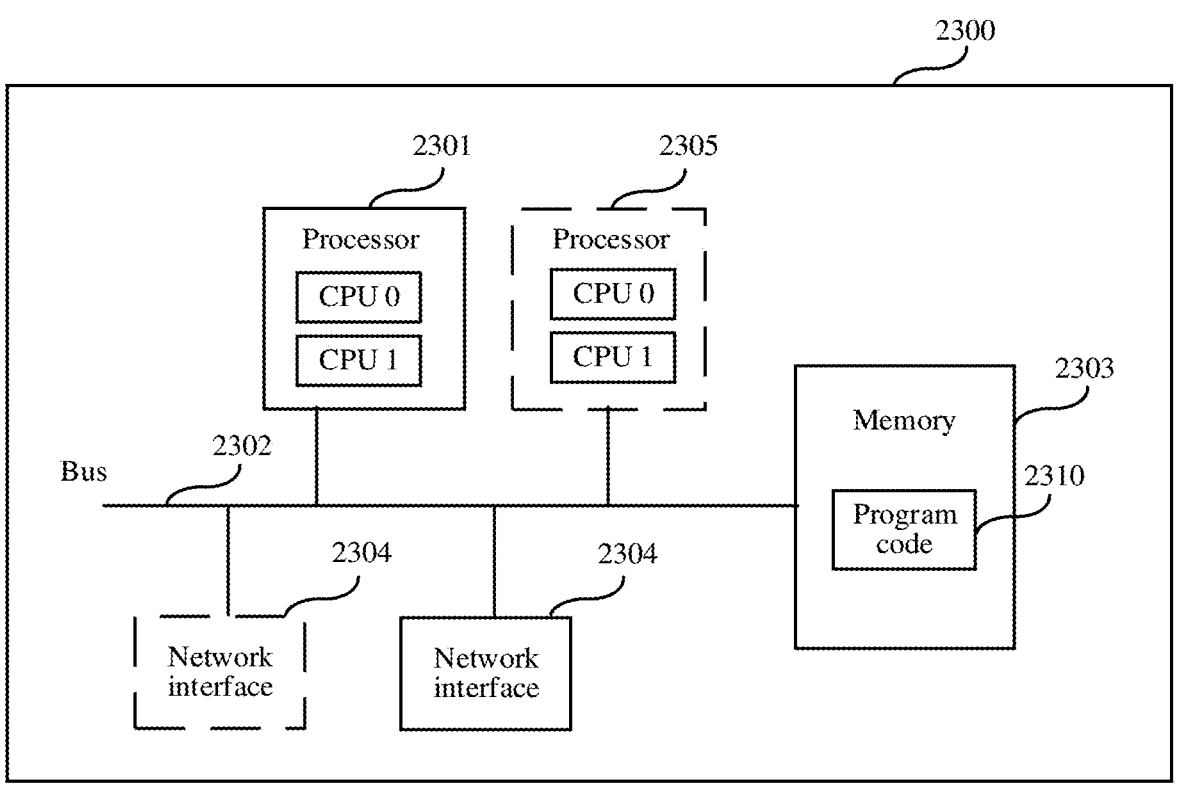
FIG. 23 is a schematic diagram of a structure of a packet processing device according to an embodiment of this application.

FIG. 23 is a schematic diagram of a structure of an example packet processing device 2300 according to this application. The packet processing device 2300 includes at least one processor 2301, a memory 2303, and at least one network interface 2304.

The processor 2301 is, for example, a general-purpose central processing unit (CPU), a digital signal processor (DSP), a network processor (NP), a GPU, a neural-network processing units (NPU), a data processing unit (DPU), a microprocessor, or one or more integrated circuits, application-specific integrated circuits (ASICs), programmable logic devices (PLDs), other general-purpose processors or other programmable logic devices, discrete gates, transistor logic devices, or discrete hardware components that are configured to implement the solutions of this application, or any combination thereof. The PLD is, for example, a complex programmable logic device (CPLD), a field programmable gate array (FPGA), a generic array logic (GAL), or any combination thereof. The general-purpose processor may be a microprocessor or any conventional processor or the like. It should be noted that the processor may be a processor that supports an advanced reduced instruction set computer machines (ARM) architecture. The processor may implement or execute various logical blocks, modules, and circuits described with reference to content disclosed in this application. Alternatively, the processor may be a combination of processors implementing a computing function, for example, a combination including one or more microprocessors, or a combination of a DSP and a microprocessor.

Optionally, the packet processing device 2300 further includes a bus 2302. The bus 2302 is configured to transfer information between components of the packet processing device 2300. The bus 2302 may be a peripheral component interconnect (PCI) bus, an extended industry standard architecture (EISA) bus, or the like. The bus 2302 may be classified into an address bus, a data bus, a control bus, and the like. For ease of representation, only one line is used in FIG. 23 for representation, but it does not mean that there is only one bus or one type of bus.

The memory 2303 is, for example, a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

By way of example, and not limitation, many forms of ROMs and RAMs are available. For example, the ROM is a compact disc read-only memory (CD-ROM). The RAM includes but is not limited to a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

Alternatively, the memory 2303 may be another type of storage device that can store static information and instructions. Alternatively, the memory 2303 may be another type of dynamic storage device that can store information and instructions. Alternatively, the memory 2303 other compact disc storage, optical disc storage (including a compact disc, a laser disc, an optical disc, a digital versatile disc, a Blu-ray disc, and the like), a magnetic disk storage medium, or another magnetic storage device, or any other medium that can be used to carry or store expected program code in a form of an instruction or a data structure and that can be accessed by a computer, but is not limited thereto. For example, the memory 2303 exists independently, and is connected to the processor 2301 by using the bus 2302. Alternatively, the memory 2303 may be integrated with the processor 2301.

The network interface 2304 is any apparatus of a transceiver type, and is configured to communicate with another device or a communication network. The communication network may be an Ethernet, a radio access network (RAN), a wireless local area network (WLAN), or the like. The network interface 2304 may include a wired network interface, and may further include a wireless network interface. Specifically, the network interface 2304 may be an Ethernet interface, for example, a fast Ethernet (FE) interface, a gigabit Ethernet (GE) interface, an asynchronous transfer mode (ATM) interface, a WLAN interface, a cellular network interface, or a combination thereof. The Ethernet interface may be an optical interface, an electrical interface, or a combination thereof. In some implementations of this application, the network interface 2304 may be used by the packet processing device 2300 to communicate with another device.

In a specific implementation, in some implementations, the processor 2301 may include one or more CPUs, for example, a CPU 0 and a CPU 1 shown in FIG. 23. Each of the processors may be a single-core processor, or may be a multi-core processor. The processor herein may be one or more devices, circuits, and/or processing cores configured to process data (for example, computer program instructions).

During specific implementation, in some implementations, the packet processing device 2300 may include a plurality of processors, for example, the processor 2301 and a processor 2305 shown in FIG. 23. Each of the processors may be a single-core processor, or may be a multi-core processor. The processor herein may be one or more devices, circuits, and/or processing cores configured to process data (for example, computer program instructions).

In some implementations, the memory 2303 is configured to store program instructions 2310 for executing the solutions of this application, and the processor 2301 may execute the program instructions 2310 stored in the memory 2303. In other words, the packet processing device 2300 may implement, by using the processor 2301 and the program instructions 2310 in the memory 2303, the methods provided in method embodiments, that is, the methods performed by the first node or the second node in FIG. 11, FIG. 17, and FIG. 18. The program instructions 2310 may include one or more software modules. Optionally, the processor 2301 may also store program instructions for executing the solutions of this application.

In a specific implementation process, the packet processing device 2300 in this application may correspond to a first network element device configured to perform the foregoing method. The processor 2301 in the packet processing device 2300 reads instructions in the memory 2303, so that the packet processing device 2300 shown in FIG. 23 can perform all or a part of the steps in method embodiments.

The packet processing device 2300 may alternatively correspond to the apparatus shown in FIG. 21 or FIG. 22. Each functional module in the apparatus shown in FIG. 21 or FIG. 22 is implemented by using software of the packet processing device 2300. In other words, the functional module included in the apparatus shown in FIG. 21 or FIG. 22 is generated after the processor 2301 of the packet processing device 2300 reads the program instructions 2310 stored in the memory 2303.

Steps of the methods shown in FIG. 11, FIG. 17, and FIG. 18 are completed by using an integrated logic circuit of hardware in the processor of the packet processing device 2300 or by using instructions in a form of software. The steps in the method embodiment disclosed with reference to this application may be directly performed and completed by a hardware processor, or may be performed and completed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in a memory, and the processor reads information in the memory, and completes the steps in the method embodiment in combination with hardware of the processor. To avoid repetition, details are not described herein again.

In an example embodiment, a packet processing system is provided. The system includes a first node and a second node. The first node is configured to perform the packet processing method performed by the first node in FIG. 11 or FIG. 18, and the second node is configured to perform the packet processing method performed by the second node in FIG. 17 or FIG. 18. The packet processing system is configured to implement the packet processing method shown in FIG. 18.

In an example embodiment, a computer-readable storage medium is provided. The computer-readable storage medium stores at least one instruction, and the instruction is loaded and executed by a processor, to enable a computer to implement the packet processing methods performed by the first node or the second node in FIG. 11, FIG. 17, and FIG. 18.

In an example embodiment, a computer program product is provided. The computer program product includes a computer program or instructions, and the computer program or the instructions are executed by a processor, to enable a computer to implement the packet processing methods performed by the first node or the second node in FIG. 11, FIG. 17, and FIG. 18.

In an example embodiment, a chip is provided, including a processor, configured to invoke, from a memory, instructions stored in the memory, and run the instructions, to enable a computer in which the chip is installed to perform the packet processing methods performed by the first node or the second node in FIG. 11, FIG. 17, and FIG. 18.

In an example embodiment, another chip is provided, including an input interface, an output interface, a processor, and a memory. The input interface, the output interface, the processor, and the memory are connected through an internal connection path. The processor is configured to execute code in the memory, and when the code is executed, a computer in which the chip is installed performs the packet processing methods performed by the first node or the second node in FIG. 11, FIG. 17, and FIG. 18.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In this application, terms such as "first" and "second" are used to distinguish between same items or similar items that have basically same functions. It should be understood that "first", "second", and "n-th" do not have a logical or time sequential dependency relationship, and do not limit the quantity and execution sequence. It should also be understood that although the following descriptions use terms such as "first" and "second" to describe various elements, these elements should not be limited by the terms. These terms are simply used to distinguish one element from another.

It should be further understood that, in embodiments of this application, sequence numbers of the processes do not mean execution sequences. The execution sequences of the processes should be determined based on functions and internal logic of the processes, and should not be construed as any limitation on implementation processes of embodiments of this application. The term "at least one" in this application means one or more, and the term "a plurality of" in this application means two or more. For example, a plurality of second devices means two or more second devices. The terms "system" and "network" are often used interchangeably herein.

It should be understood that the terms used in the descriptions of the various examples herein are merely intended to describe specific examples and are not intended to impose a limitation. The terms "one" ("a" and "an") and "the" of singular forms used in the descriptions of the various examples and the appended claims are also intended to include plural forms, unless otherwise specified in the context clearly.

It should further be understood that the term "and/or" used in this specification indicates and includes any or all possible combinations of one or more of the associated listed items. The term "and/or" describes an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

It should be further understood that the terms "if" and "if" may be interpreted to mean "when" ("when" or "upon") or "in response to determining" or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

The foregoing descriptions are embodiments of this application, but are not intended to limit this application. Any modification, equivalent replacement, improvement, or the like made without departing from the principle of this application should fall within the protection scope of this application.

What is claimed is:

1. A network device applied to a first node, comprising: one or more memories configured to store instructions; and one or more processors coupled to the one or more memories and configured to execute the instructions, wherein execution of the instructions causes the network device to perform operations including:

receiving a first packet, wherein the first packet comprises a destination address (DA) field and a segment routing header (SRH), the DA field comprises at least one compressed segment identifier (C-SID) that is sequentially arranged, each C-SID in the at least one C-SID corresponds to a respective processing flavor indicating a movement operation or a replacement operation, and the at least one C-SID comprises a first C-SID corresponding to the first node;

determining, depending on whether another C-SID is further after the first C-SID, whether a first processing flavor corresponding to the first C-SID indicates the movement operation or the replacement operation; and based on that the first processing flavor indicates the movement operation, moving a target field, to enable the target field to cover the first C-SID in the DA field, wherein the target field is after the first C-SID and in the DA field; or based on that the first processing flavor indicates the replacement operation, replacing the first C-SID in the DA field with a second C-SID, wherein the second C-SID is in the SRH.

2. The network device according to claim 1, the determining comprising:

determining, based on that another C-SID is after the first C-SID, that the first processing flavor indicates the movement operation; or determining, based on that there is no another C-SID after the first C-SID, that the first processing flavor indicates the replacement operation.

3. The network device according to claim 1, wherein the first packet further comprises a first pointer and a second pointer, the operations further comprising:

updating a first value of the first pointer and a second value of the second pointer, to enable the first value of the first pointer to indicate a first location of the second C-SID in a container in which the second C-SID is located, and to enable the second value of the second pointer to indicate a second location that is in the SRH and that is of the container in which the second C-SID is located; and determining the second C-SID based on the first value of the first pointer and the second value of the second pointer.

4. The network device according to claim 1, wherein the first packet further comprises a first pointer and a second pointer, the operations further comprising:

updating a first value of the first pointer, to enable the first value of the first pointer to indicate a first location of the second C-SID in a container in which the second C-SID is located; and determining the second C-SID based on the first value of the first pointer and a second value of the second pointer, wherein the second value of the second pointer indicates a second location that is in the SRH and that is of the container in which the second C-SID is located.

5. The network device according to claim 3, the updating the first value of the first pointer comprising:

determining that the first value of the first pointer is N−1, wherein N is a maximum quantity of C-SIDs accommodated in the container; or subtracting 1 from the first value of the first pointer.

6. The network device according to claim 3, wherein the container is comprised in the SRH, and a length of the container is 128 bits.

7. The network device according to claim 1, wherein the respective processing flavor corresponds to a node behavior, or the respective processing flavor comprises the node behavior.

8. The network device according to claim 1, wherein the first C-SID comprises a node identifier field, a C-SID following the first C-SID comprises a function field, and the C-SID following the first C-SID corresponds to the first node.

9. The network device according to claim 1, wherein the first C-SID comprises a function field, and a C-SID following the first C-SID corresponds to a downstream node of the first node in a forwarding path of the first packet.

10. The network device according to claim 1, wherein the DA field further comprises an address block, and the address block is before the at least one C-SID.

11. The network device according to claim 1, wherein the SRH does not comprise an address block corresponding to the first C-SID.

12. A network device applied to a second node, comprising:

one or more memories configured to store instructions; and one or more processors coupled to the one or more memories and configured to execute the instructions, wherein execution of the instructions causes the network device to perform operations including:

receiving a second packet;

obtaining a first packet based on the second packet, wherein the first packet comprises a destination address (DA) field and a segment routing header (SRH), the DA field comprises at least one compressed segment identifier (C-SID) that is sequentially arranged, each C-SID in the at least one C-SID corresponds to a respective processing flavor indicating a movement operation or a replacement operation, and the at least one C-SID comprises a first C-SID corresponding to a first node; and sending the first packet to the first node, wherein:

a first processing flavor corresponding to the first C-SID is used by the first node to determine, depending on whether another C-SID is further after the first C-SID, whether the first processing flavor indicates the movement operation or the replacement operation; and based on that the first processing flavor indicates the movement operation, the first processing flavor is used by the first node to move a target field, to enable the target field to cover the first C-SID in the DA field, wherein the target field is after the first C-SID and in the DA field; or based in that the first processing flavor indicates the replacement operation, the first processing flavor is used by the first node to replace the first C-SID in the DA field with a second C-SID, wherein the second C-SID is in the SRH.

13. A packet processing system, wherein the packet processing system comprises a first node and a second node, the first node is configured to:

receive a first packet, wherein the first packet comprises a destination address (DA) field and a segment routing header (SRH), the DA field comprises at least one compressed segment identifier (C-SID) that is sequentially arranged, each C-SID in the at least one C-SID corresponds to a respective processing flavor indicating a movement operation or a replacement operation, and the at least one C-SID comprises a first C-SID corresponding to the first node;

determine, depending on whether another C-SID is further after the first C-SID, whether a first processing flavor corresponding to the first C-SID indicates the movement operation or the replacement operation; and based on that the first processing flavor indicates the movement operation, move a target field, to enable the target field to cover the first C-SID in the DA field, wherein the target field is after the first C-SID and in the DA field; or based on that the first processing flavor indicates the replacement operation, replace the first C-SID in the DA field with a second C-SID, wherein the second C-SID is in the SRH; and the second node is configured to:

receive a second packet;

obtain the first packet based on the second packet; and send the first packet to the first node.

14. The packet processing system according to claim 13, wherein the first node is further configured to determine whether the first processing flavor corresponding to the first C-SID indicates the movement operation or the replacement operation by:

determining, based on that another C-SID is after the first C-SID, that the first processing flavor indicates the movement operation; or determining, based on that there is no another C-SID after the first C-SID, that the first processing flavor indicates the replacement operation.

15. The packet processing system according to claim 13, wherein the first packet further comprises a first pointer and a second pointer, and wherein the first node is further configured to:

update a first value of the first pointer and a second value of the second pointer, to enable the first value of the first pointer to indicate a first location of the second C-SID in a container in which the second C-SID is located, and to enable the second value of the second pointer to indicate a second location that is in the SRH and that is of the container in which the second C-SID is located; and determine the second C-SID based on the first value of the first pointer and the second value of the second pointer.

16. The packet processing system according to claim 13, wherein the respective processing flavor corresponds to a node behavior, or the respective processing flavor comprises the node behavior.

17. The packet processing system according to claim 13, wherein the first C-SID comprises a node identifier field, a C-SID following the first C-SID comprises a function field, and the C-SID following the first C-SID corresponds to the first node.

18. The packet processing system according to claim 13, wherein the first C-SID comprises a function field, and a C-SID following the first C-SID corresponds to a downstream node of the first node in a forwarding path of the first packet.

19. The packet processing system according to claim 13, wherein the DA field further comprises an address block, and the address block is before the at least one C-SID.

20. The packet processing system according to claim 13, wherein the SRH does not comprise an address block corresponding to the first C-SID.

* * * * *